United States Patent
Dufresne

(10) Patent No.: US 11,698,270 B2
(45) Date of Patent: Jul. 11, 2023

(54) METHOD, SYSTEM, AND COMPUTER PROGRAM PRODUCT FOR ITERATIVE WARPING OF MAPS FOR AUTONOMOUS VEHICLES AND SIMULATORS

(71) Applicant: Argo AI, LLC, Pittsburgh, PA (US)

(72) Inventor: Bradley Thomas Dufresne, Ann Arbor, MI (US)

(73) Assignee: Argo AI, LLC, Pittsburgh, PA (US)

(*) Notice: Subject to any disclaimer, the term of this patent is extended or adjusted under 35 U.S.C. 154(b) by 275 days.

(21) Appl. No.: 17/217,229

(22) Filed: Mar. 30, 2021

(65) Prior Publication Data

US 2022/0316910 A1  Oct. 6, 2022

(51) Int. Cl.
  *G05D 1/02* (2020.01)
  *G01C 21/00* (2006.01)

(52) U.S. Cl.
  CPC ....... *G01C 21/3815* (2020.08); *G05D 1/0212* (2013.01); *G05D 2201/0213* (2013.01)

(58) Field of Classification Search
  CPC ............. G01C 21/3815; G05D 1/0212; G05D 2201/0213
  See application file for complete search history.

(56) References Cited

U.S. PATENT DOCUMENTS

| | | | |
|---|---|---|---|
| 9,470,533 B2 | 10/2016 | Obara | |
| 10,529,089 B2 | 1/2020 | Ahmad et al. | |
| 10,782,136 B2 * | 9/2020 | Adams | G01C 21/3859 |
| 2017/0015317 A1 * | 1/2017 | Fasola | G01C 21/165 |
| 2018/0004226 A1 | 1/2018 | Milstein et al. | |
| 2019/0369626 A1 | 12/2019 | Lui et al. | |
| 2020/0081452 A1 * | 3/2020 | Yoshida | G06F 17/16 |
| 2020/0247431 A1 | 8/2020 | Ferencz et al. | |

FOREIGN PATENT DOCUMENTS

EP  2749845 B1  5/2017

* cited by examiner

*Primary Examiner* — Redhwan K Mawari
*Assistant Examiner* — Godfrey Aleksander Maciorowski
(74) *Attorney, Agent, or Firm* — The Webb Law Firm

(57) ABSTRACT

Methods, systems, and products for generating an updated map for use with an autonomous vehicle driving operation or a simulation thereof may include obtaining first map data associated with a first map of a geographic location including a roadway, and the first map data may include at least one first lane segment. Second map data associated with a second map of the geographic location may be obtained, and the second map data may include at least one second lane segment. A plurality of non-overlapping areas may be determined based on the first lane segment(s) and the second lane segment(s). A first non-overlapping and/or a first warp point within the first non-overlapping area may be selected. The first lane segment(s) may be warped around the first warp point to increase a total overlapping area based on the based on the second lane segment(s) and the first lane segment(s) after warping.

18 Claims, 11 Drawing Sheets

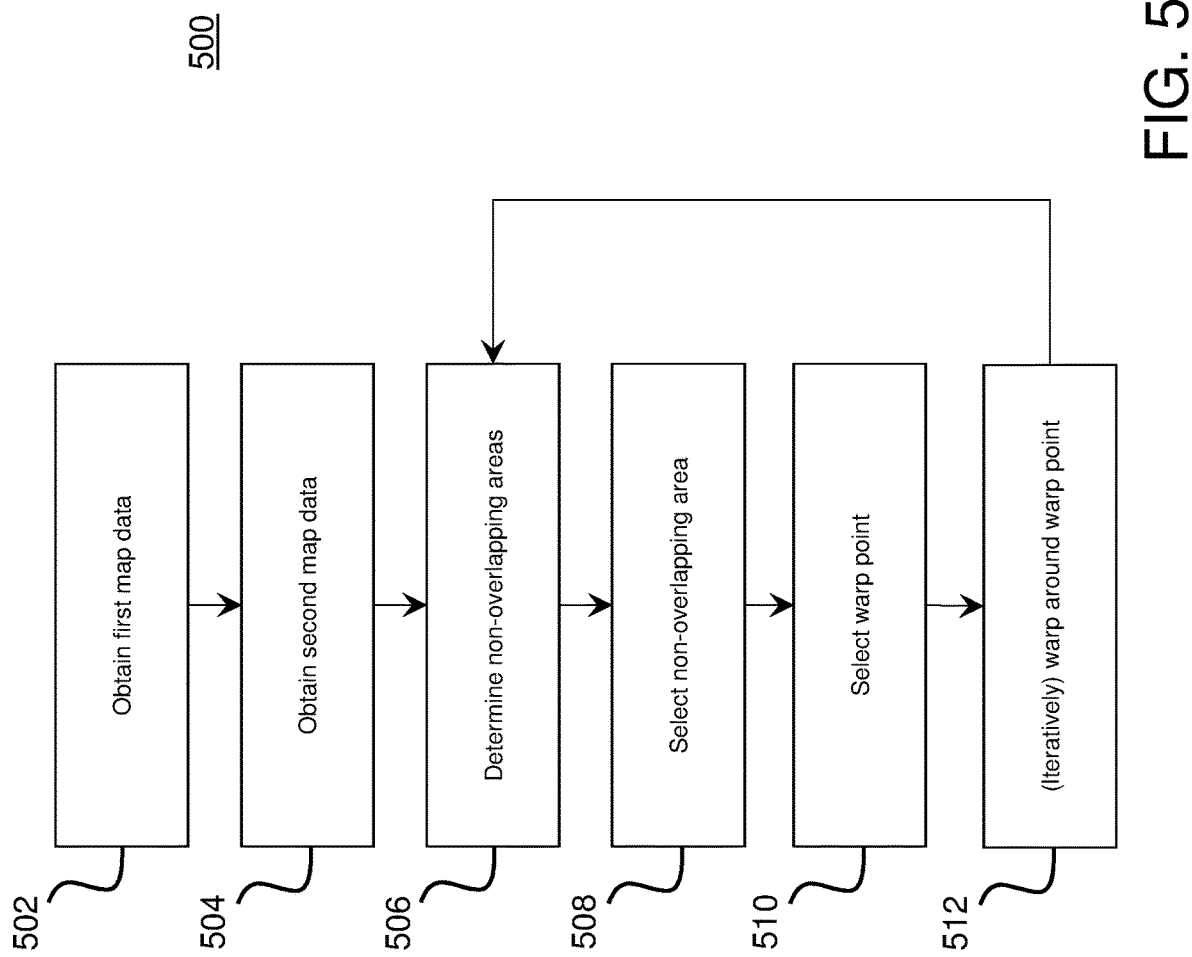

METHOD, SYSTEM, AND COMPUTER PROGRAM PRODUCT FOR ITERATIVE WARPING OF MAPS FOR AUTONOMOUS VEHICLES AND SIMULATORS

BACKGROUND

1. Field

This disclosed subject matter relates generally to methods, systems, and products for mapping and, in some particular embodiments or aspects, to a method, system, and computer program product for iterative warping or maps for autonomous vehicles and simulators.

2. Technical Considerations

Certain systems (e.g., navigation systems, autonomous vehicles, autonomous driving systems, autonomous flying systems, simulation systems, and/or the like) rely on accurate maps. Such maps need to be updated over time to reflect new information. For example, a new map of a geographic location may be generated when changes happen in or around that location (e.g., changes to road structure, changes to lanes of a road as a result of new construction, changes to a geographic location due to changing natural conditions (e.g., earthquakes, avalanches, mud slides, geothermal activity, geologic movement, and/or the like), presence of obstructions and/or motion of such obstructions, changes to restricted areas within a geographic location, and/or the like). Additionally or alternatively, a new map of a geographic location may be generated using new and/or more accurate map generating systems (e.g., a laser scanner, LiDAR, radar, image processing, any combination thereof, and/or the like).

However, even though the two maps (e.g., a first map and a second map, an older map and a newer map, an existing map and an updated map, and/or the like) represent the same geographic location, new information in the second map may include changes to certain features in the first map (e.g., changes to a road structure, more accurate position data of the road structure, changes to lane segments determined based on the road structure, and/or the like). Additionally or alternatively, a map generation process (e.g., vector map generation process and/or the like) may not keep a strict history of lane segments and/or may not keep the locations of lane segments consistent, and as such, the division of individual lane segments may not be a reliable source of position information (e.g., given lane A in the first map and lane B in the second map, where B is the most similar lane in shape and position to lane A, converting a location within lane A to a corresponding location within lane B may often be an unreliable method of maintaining logical position within the map). Therefore, given two maps (e.g., vector maps of lane segments and/or the like) representing approximately the same geographic location (e.g., representing a same area of a roadway), accurately identifying corresponding positions between the first and second maps and/or updating a given location on the first map based on the corresponding location on the second map can be difficult.

Certain techniques (e.g., Iterative Closest Point (ICP)) may be used to determine a transformation (e.g., a translation and/or a rotation) to minimize the difference between a first (e.g., reference) point cloud and a second (e.g., source) point cloud. However, such techniques may apply a uniform transformation to the entire point cloud (e.g., every point in the second/source point cloud will have the same translation and rotation as every other point therein), so the transformation may not account for localized differences. Additionally, such techniques may rely on an assumption that a closest point in the first/reference point cloud to each respective point in the second/source point cloud is the corresponding point thereto (e.g., because the calculated error of such techniques may be based on the distance between such points), but this assumption may not be true. Additionally, the result of such techniques may be merely a set of discrete numbers (e.g., a transformation matrix, positions of transformed points, and/or the like), and as such the transformation is not a continuous function, is not easily explainable, and/or may not account for localized differences.

SUMMARY

Accordingly, it is an object of the presently disclosed subject matter to provide methods, systems, and computer program products for iterative warping of maps, e.g., for autonomous vehicles and/or simulators, that overcome some or all of the deficiencies identified above.

According to non-limiting embodiments or aspects, provided is a method for generating an updated map and/or a continuous function for calculating equivalent spatial location between maps, e.g., for use with an autonomous vehicle driving operation or a simulation thereof. In some non-limiting embodiments or aspects, such a method may include obtaining first map data associated with a first map of a geographic location comprising a roadway. The first map data may include at least one first lane segment representing the roadway. Second map data associated with a second map of the geographic location may be obtained. The second map data may include at least one second lane segment representing the roadway. A plurality of non-overlapping areas based on the at least one first lane segment and the at least one second lane segment may be determined. A first non-overlapping area of the plurality of non-overlapping areas may be selected. A first warp point may be selected within the first non-overlapping area. The at least one first lane segment may be warped around the first warp point to increase a total overlapping area based on the at least one second lane segment and the at least one first lane segment after warping to generate updated map data associated with an updated map of the geographic location comprising the roadway.

In some non-limiting embodiments, the first map data may include first vector map data associated with a first vector map of the geographic location. Additionally or alternatively, the second map data may include second vector map data associated with a second vector map of the geographic location.

In some non-limiting embodiments, determining the plurality of non-overlapping areas may include determining the symmetric difference of the at least one first lane segment and the at least one second lane segment.

In some non-limiting embodiments, the at least one first lane segment may include a plurality of first lane segments. Additionally or alternatively, the at least one second lane segment may include a plurality of second lane segments. In some non-limiting embodiments, determining the plurality of non-overlapping areas may include merging the plurality of first lane segments to provide a first polygon. Additionally or alternatively, the plurality of second lane segments may be merged to provide a second polygon. Additionally or alternatively at least one of the following may be determined: at least one first area of the first polygon that does not overlap the second polygon, at least one second area of the second polygon that does not overlap the first polygon, any combination thereof, and/or the like. Additionally or alternatively, the plurality of non-overlapping areas may include at least one of the first area(s), the second area(s), any combination thereof, and/or the like.

In some non-limiting embodiments, selecting the first non-overlapping area may include determining an area of each non-overlapping area of the plurality of non-overlapping areas, and selecting a non-overlapping area of the plurality of non-overlapping areas having a greatest area as the first non-overlapping area. For example, a contiguous region of the plurality of non-overlapping areas that has the greatest area may be selected as the first non-overlapping area.

In some non-limiting embodiments, selecting the first warp point may include determining a centroid of the first non-overlapping area and selecting the centroid as the first warp point.

In some non-limiting embodiments, warping the at least one first lane segment may include adjusting the first warp point and points of the at least one first lane segment around the first warp point using inverse distance weighted interpolation, determining the total overlapping area based on the at least one second lane segment and the at least one first lane segment after the adjusting, and/or iteratively repeating the adjusting and the determining of the total overlapping area until the total overlapping area reaches a local maximum.

In some non-limiting embodiments, a further plurality of non-overlapping areas may be determined based on the at least one first lane segment after the warping and the at least one second lane segment. Additionally or alternatively, a further non-overlapping area of the further plurality of non-overlapping areas may be selecting. Additionally or alternatively, a further warp point may be selected within the further non-overlapping area. Additionally or alternatively, the at least one first lane segment may be warped around the further warp point to increase the total overlapping area based on the at least one second lane segment and the at least one first lane segment after warping. Additionally or alternatively, the determining of the further plurality of non-overlapping areas, the selecting of the further non-overlapping area, the selecting of the further warp point, and/or the warping of the at least one first lane segment around the further warp point may be iteratively repeated until the total overlapping area reaches a local maximum.

In some non-limiting embodiments, the first map data including the at least one first lane segment after the warping may be used to facilitate at least one autonomous driving operation of an autonomous vehicle, to facilitate at least one simulated autonomous driving operation of a simulated autonomous vehicle, any combination thereof, and/or the like.

According to non-limiting embodiments or aspects, provided is a system for generating an updated map and/or a continuous function for calculating equivalent spatial location between maps, e.g., for use with an autonomous vehicle driving operation or a simulation thereof. In some non-limiting embodiments or aspects, such a system may include a map database configured to store first map data associated with a first map of a geographic location comprising a roadway, the first map data including at least one first lane segment representing the roadway. A map data source system may be configured to obtain second map data associated with a second map of the geographic location, the second map data including at least one second lane segment representing the roadway. A mapping system may be configured to obtain, from the map database, the first map data; obtain, from the map data source system, the second map data; determine a plurality of non-overlapping areas based on the at least one first lane segment and the at least one second lane segment; select a first non-overlapping area of the plurality of non-overlapping areas; select a first warp point within the first non-overlapping area; and/or warp the at least one first lane segment around the first warp point to increase a total overlapping area based on the at least one second lane segment and the at least one first lane segment after warping to generate updated map data associated with an updated map of the geographic location comprising the roadway.

In some non-limiting embodiments, the map data source system may include an autonomous vehicle comprising a ray-casting system configured to generate the second map data based on ray-casting operations of the ray-casting system.

In some non-limiting embodiments, determining the plurality of non-overlapping areas may include determining the symmetric difference of the at least one first lane segment and the at least one second lane segment.

In some non-limiting embodiments, determining the plurality of non-overlapping areas may include determining at least one first area of the at least one first lane segment that does not overlap the at least one second lane segment and/or determining at least one second area of the at least one second lane segment that does not overlap the at least one first lane segment. Additionally or alternatively, the plurality of non-overlapping areas may include at least one of the first area(s), the second area(s), any combination thereof, and/or the like.

In some non-limiting embodiments, selecting the first non-overlapping area may include determining an area of each non-overlapping area of the plurality of non-overlapping areas and/or selecting a non-overlapping area of the plurality of non-overlapping areas having a greatest area as the first non-overlapping area.

In some non-limiting embodiments, selecting the first warp point may include determining a centroid of the first non-overlapping area and/or selecting the centroid as the first warp point.

In some non-limiting embodiments, warping the at least one first lane segment may include adjusting the first warp point and points of the at least one first lane segment around the first warp point using inverse distance weighted interpolation, determining the total overlapping area based on the at least one second lane segment and the at least one first lane segment after the adjusting, and/or iteratively repeating the adjusting and the determining of the total overlapping area until the total overlapping area reaches a local maximum.

In some non-limiting embodiments, the mapping system may be further configured to determine a further plurality of non-overlapping areas based on the at least one first lane segment after the warping and the at least one second lane segment, select a further non-overlapping area of the further plurality of non-overlapping areas, select a further warp point within the further non-overlapping area, warp the at least one first lane segment around the further warp point to increase the total overlapping area based on the at least one second lane segment and the at least one first lane segment after warping, and/or iteratively repeat the determining of the further plurality of non-overlapping areas, the selecting of the further non-overlapping area, the selecting of the further warp point, and the warping of the at least one first lane segment around the further warp point until the total overlapping area reaches a local maximum.

In some non-limiting embodiments, an autonomous vehicle may be included. Additionally or alternatively, the mapping system may be configured to communicate the first map data including the at least one first lane segment after the warping to the autonomous vehicle. Additionally or alternatively, the autonomous vehicle may be configured to use the first map data including the at least one first lane segment after the warping to facilitate at least one autonomous driving operation of the autonomous vehicle.

In some non-limiting embodiments, a simulation system may be included. Additionally or alternatively, the mapping system may be configured to communicate the first map data including the at least one first lane segment after the warping to the simulation system. Additionally or alternatively, the simulation system may be configured to use the first map data including the at least one first lane segment after the warping to facilitate at least one simulated autonomous driving operation of a simulated autonomous vehicle.

According to non-limiting embodiments or aspects, provided is a computer program product for generating an updated map and/or a continuous function for calculating equivalent spatial location between maps, e.g., for use with an autonomous vehicle driving operation or a simulation thereof. In some non-limiting embodiments or aspects, such a computer program product may include at least one non-transitory computer-readable medium comprising one or more instructions that, when executed by at least one processor, cause the at least one processor to obtain first map data associated with a first map of a geographic location comprising a roadway (e.g., the first map data including at least one first lane segment representing the roadway), obtain second map data associated with a second map of the geographic location (e.g., the second map data including at least one second lane segment representing the roadway), determine a plurality of non-overlapping areas based on the at least one first lane segment and the at least one second lane segment, select a first non-overlapping area of the plurality of non-overlapping areas, select a first warp point within the first non-overlapping area, and/or warp the at least one first lane segment around the first warp point to increase a total overlapping area based on the at least one second lane segment and the at least one first lane segment after warping.

Further embodiments or aspects are set forth in the following numbered clauses:

Clause 1: A method for generating an updated map for use with an autonomous vehicle driving operation or a simulation thereof, comprising: obtaining, with at least one processor, first map data associated with a first map of a geographic location comprising a roadway, the first map data comprising at least one first lane segment representing the roadway; obtaining, with the at least one processor, second map data associated with a second map of the geographic location, the second map data comprising at least one second lane segment representing the roadway; determining, with the at least one processor, a plurality of non-overlapping areas based on the at least one first lane segment and the at least one second lane segment; selecting, with the at least one processor, a first non-overlapping area of the plurality of non-overlapping areas; selecting, with the at least one processor, a first warp point within the first non-overlapping area; and warping, with the at least one processor, the at least one first lane segment around the first warp point to increase a total overlapping area based on the at least one second lane segment and the at least one first lane segment after warping to generate updated map data associated with an updated map of the geographic location comprising the roadway.

Clause 2: The method of clause 1, wherein the first map data comprises first vector map data associated with a first vector map of the geographic location and the second map data comprises second vector map data associated with a second vector map of the geographic location.

Clause 3: The method of any preceding clause, wherein determining the plurality of non-overlapping areas comprises determining the symmetric difference of the at least one first lane segment and the at least one second lane segment.

Clause 4: The method of any preceding clause, wherein the at least one first lane segment comprises a plurality of first lane segments and the at least one second lane segment comprises a plurality of second lane segments, wherein determining the plurality of non-overlapping areas comprises: merging, with the at least one processor, the plurality of first lane segments to provide a first polygon; merging, with the at least one processor, the plurality of second lane segments to provide a second polygon; determining, with the at least one processor, at least one first area of the first polygon that does not overlap the second polygon; and determining, with the at least one processor, at least one second area of the second polygon that does not overlap the first polygon, wherein the plurality of non-overlapping areas comprises the at least one first area and the at least one second area.

Clause 5: The method of any preceding clause, wherein selecting the first non-overlapping area comprises: determining, with the at least one processor, an area of each non-overlapping area of the plurality of non-overlapping areas; and selecting, with the at least one processor, a non-overlapping area of the plurality of non-overlapping areas having a greatest area as the first non-overlapping area.

Clause 6: The method of any preceding clause, wherein selecting the first warp point comprises: determining, with the at least one processor, a centroid of the first non-overlapping area; and selecting, with the at least one processor, the centroid as the first warp point.

Clause 7: The method of any preceding clause, wherein warping the at least one first lane segment comprises: adjusting, with the at least one processor, the first warp point and points of the at least one first lane segment around the first warp point using inverse distance weighted interpolation; determining, with the at least one processor, the total overlapping area based on the at least one second lane segment and the at least one first lane segment after the adjusting; and iteratively repeating the adjusting and the determining of the total overlapping area until the total overlapping area reaches a local maximum.

Clause 8: The method of any preceding clause, further comprising: determining, with the at least one processor, a further plurality of non-overlapping areas based on the at least one first lane segment after the warping and the at least one second lane segment; selecting, with the at least one processor, a further non-overlapping area of the further plurality of non-overlapping areas; selecting, with the at least one processor, a further warp point within the further non-overlapping area; warping, with the at least one processor, the at least one first lane segment around the further warp point to increase the total overlapping area based on the at least one second lane segment and the at least one first lane segment after warping; and iteratively repeating the determining of the further plurality of non-overlapping areas, the selecting of the further non-overlapping area, the selecting of the further warp point, and the warping of the at least one first lane segment around the further warp point until the total overlapping area reaches a local maximum.

Clause 9: The method of any preceding clause, further comprising: using, with the at least one processor, the first map data comprising the at least one first lane segment after the warping to facilitate at least one autonomous driving operation of an autonomous vehicle or to facilitate at least one simulated autonomous driving operation of a simulated autonomous vehicle.

Clause 10: A system for generating an updated map for use with an autonomous vehicle driving operation or a simulation thereof, comprising: a map database configured to store first map data associated with a first map of a geographic location comprising a roadway, the first map data comprising at least one first lane segment representing the roadway; a map data source system configured to obtain second map data associated with a second map of the geographic location, the second map data comprising at least one second lane segment representing the roadway; and a mapping system configured to: obtain, from the map database, the first map data; obtain, from the map data source system, the second map data; determine a plurality of non-overlapping areas based on the at least one first lane segment and the at least one second lane segment; select a first non-overlapping area of the plurality of non-overlapping areas; select a first warp point within the first non-overlapping area; and warp the at least one first lane segment around the first warp point to increase a total overlapping area based on the at least one second lane segment and the at least one first lane segment after warping to generate updated map data associated with an updated map of the geographic location comprising the roadway.

Clause 11: The system of clause 10, wherein the map data source system comprises an autonomous vehicle comprising a ray-casting system configured to generate the second map data based on ray-casting operations of the ray-casting system.

Clause 12: The system of any one of clauses 10-11, wherein determining the plurality of non-overlapping areas comprises determining the symmetric difference of the at least one first lane segment and the at least one second lane segment.

Clause 13: The system of any one of clauses 10-12, wherein determining the plurality of non-overlapping areas comprises: determining at least one first area of the at least one first lane segment that does not overlap the at least one second lane segment; and determining at least one second area of the at least one second lane segment that does not overlap the at least one first lane segment, wherein the plurality of non-overlapping areas comprises the at least one first area and the at least one second area.

Clause 14: The system of any one of clauses 10-13, wherein selecting the first non-overlapping area comprises: determining an area of each non-overlapping area of the plurality of non-overlapping areas; and selecting a non-overlapping area of the plurality of non-overlapping areas having a greatest area as the first non-overlapping area.

Clause 15: The system of any one of clauses 10-14, wherein selecting the first warp point comprises: determining a centroid of the first non-overlapping area; and selecting the centroid as the first warp point.

Clause 16: The system of any one of clauses 10-15, wherein warping the at least one first lane segment comprises: adjusting the first warp point and points of the at least one first lane segment around the first warp point using inverse distance weighted interpolation; determining the total overlapping area based on the at least one second lane segment and the at least one first lane segment after the adjusting; and iteratively repeating the adjusting and the determining of the total overlapping area until the total overlapping area reaches a local maximum.

Clause 17: The system of any one of clauses 10-16, wherein the mapping system is further configured to: determine a further plurality of non-overlapping areas based on the at least one first lane segment after the warping and the at least one second lane segment; select a further non-overlapping area of the further plurality of non-overlapping areas; select a further warp point within the further non-overlapping area; warp the at least one first lane segment around the further warp point to increase the total overlapping area based on the at least one second lane segment and the at least one first lane segment after warping; and iteratively repeat the determining of the further plurality of non-overlapping areas, the selecting of the further non-overlapping area, the selecting of the further warp point, and the warping of the at least one first lane segment around the further warp point until the total overlapping area reaches a local maximum.

Clause 18: The system of any one of clauses 10-17, further comprising an autonomous vehicle, wherein the mapping system is further configured to communicate the first map data comprising the at least one first lane segment after the warping to the autonomous vehicle, and wherein the autonomous vehicle is configured to use the first map data comprising the at least one first lane segment after the warping to facilitate at least one autonomous driving operation of the autonomous vehicle.

Clause 19: The system of any one of clauses 10-18, further comprising a simulation system, wherein the mapping system is further configured to communicate the first map data comprising the at least one first lane segment after the warping to the simulation system, and wherein the simulation system is configured to use the first map data comprising the at least one first lane segment after the warping to facilitate at least one simulated autonomous driving operation of a simulated autonomous vehicle.

Clause 20: A computer program product for generating an updated map for use with an autonomous vehicle driving operation or a simulation thereof, the computer program product comprising at least one non-transitory computer-readable medium comprising one or more instructions that, when executed by at least one processor, cause the at least one processor to: obtain first map data associated with a first map of a geographic location comprising a roadway, the first map data comprising at least one first lane segment representing the roadway; obtain second map data associated with a second map of the geographic location, the second map data comprising at least one second lane segment representing the roadway; determine a plurality of non-overlapping areas based on the at least one first lane segment and the at least one second lane segment; select a first non-overlapping area of the plurality of non-overlapping areas; select a first warp point within the first non-overlapping area; and warp the at least one first lane segment around the first warp point to increase a total overlapping area based on the at least one second lane segment and the at least one first lane segment after warping.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which:

FIG. 5 is a flowchart of a non-limiting embodiment or aspect of a process for iterative map warping according to the principles of the presently disclosed subject matter;

DESCRIPTION

Figure 1:
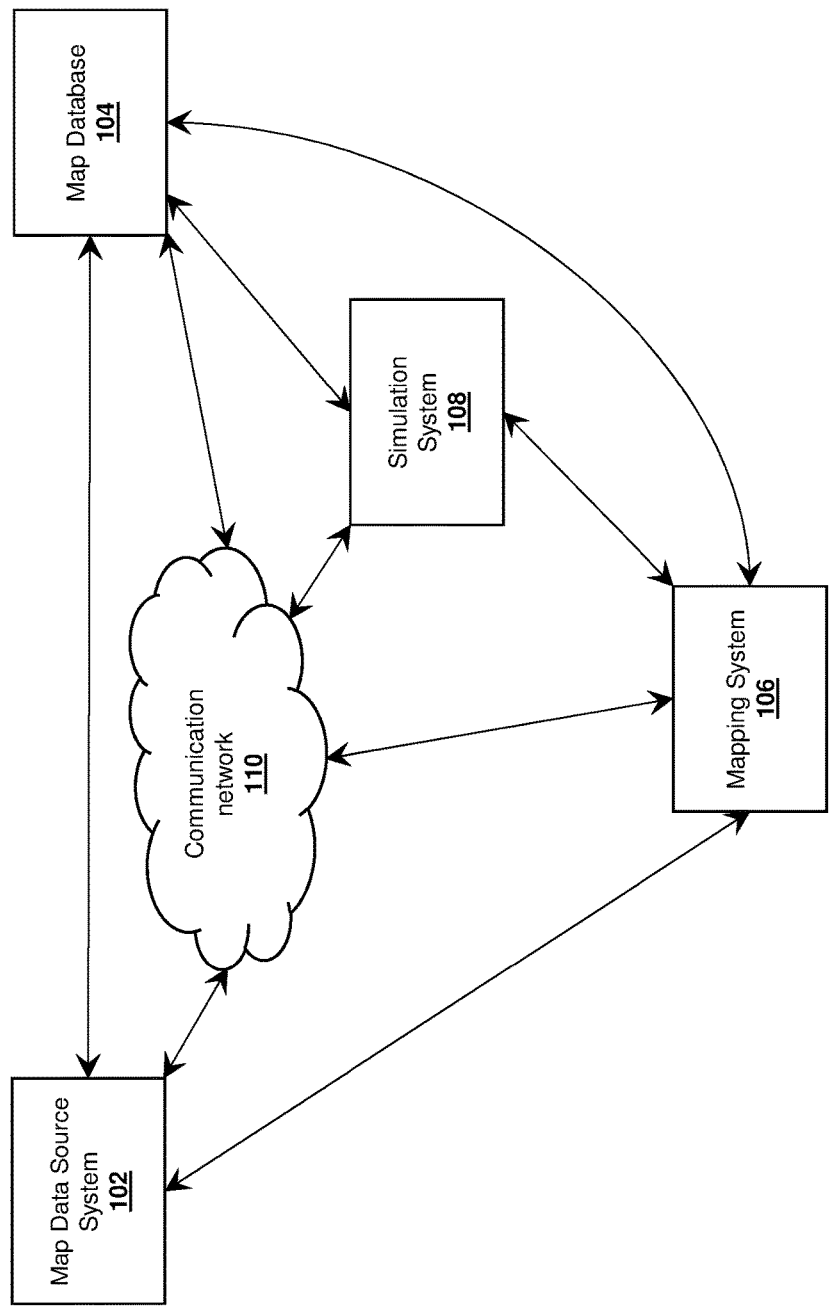
FIG. 1 is a diagram of a non-limiting embodiment or aspect of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the term "user interface" or "graphical user interface" may refer to a generated display, such as one or more graphical user interfaces (GUIs) with which a user may interact, either directly or indirectly (e.g., through a keyboard, mouse, touchscreen, etc.).

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Non-limiting embodiments or aspects of the disclosed subject matter are directed to systems, methods, and computer program products for iterative map warping, including, but not limited to, iterative warping to facilitate map generation and autonomous driving operations of an autonomous vehicle. For example, non-limiting embodiments or aspects of the disclosed subject matter provide obtaining map data associated with first and second maps of a geographic location (e.g., including a roadway), determining a plurality of non-overlapping areas based on at least one first lane segment (e.g., from map data of the first map) and at least one second lane segment (e.g., from map data of the second map), selecting a non-overlapping area and a warp point therein, and iteratively warping the first lane segment(s) around the first warp point to increase a total overlapping area between the second map (e.g., second lane segments thereof) and the first map (e.g., first lane segment(s) thereof) after warping. Such embodiments or aspects provide techniques and systems that provide a continuous function to warp a first map to increase (e.g., maximize) the overlap (and/or reduce (e.g., minimize) the difference) between the first map and a second map, which is robust to changes between the two maps (e.g., changes to a road structure, more accurate position data of the road structure, changes to lane segments determined based on the road structure, and/or the like), does not rely on lane segmentation, and does not rely on assumptions regarding corresponding positions and/or closes points between the two maps. Additionally or alternatively, such embodiments or aspects provide techniques and systems that provide a continuous function (e.g., based on the warping around the warp point(s), the result of which may be a continuous function across the entire first map) for translating between the first and second maps that can be used repeatedly without additional searching and/or re-calculating the translation of individual points. Additionally or alternatively, such embodiments or aspects provide techniques and systems that enable translation of the entire first map to the second map that takes into account localized differences (e.g., localized warping around the warp point(s)). Additionally or alternatively, such embodiments or aspects provide techniques and systems that enable translation of any point in the (first) map, even if there is no lane segment near the point. Additionally or alternatively, such embodiments or aspects provide techniques and systems that account for localized differences between the first and second maps (e.g., localized warping around the warp point(s)), rather than a single uniform translation. Additionally or alternatively, such embodiments or aspects allow for warping the first map (e.g., for translation between the first and second map) without relying on assumptions about the closest and/or corresponding points. Additionally or alternatively, such embodiments or aspects provide techniques and systems that provide a continuous function (e.g., based on the warping around the warp point(s)) that is easily explainable, rather than a discrete set of numbers.

For the purpose of illustration, in the following description, while the presently disclosed subject matter is described with respect to methods, systems, and computer program products for iterative map warping, e.g., to facilitate autonomous driving operations of an autonomous vehicle, one skilled in the art will recognize that the disclosed subject matter is not limited to the illustrative embodiments or aspects. For example, the methods, systems, and computer program products described herein may be used with a wide variety of settings, such as iterative map warping in any setting suitable for using maps, e.g., navigation, shipping, logistics, driving, flying, boating, and/or the like.

Referring now to FIG. 1, FIG. 1 is a diagram of a non-limiting embodiment or aspect of an environment 100 in which systems, products, and/or methods, as described herein, may be implemented. As shown in FIG. 1, environment 100 may include map data source system 102, map database 104, mapping system 106, simulation system 108, and/or communication network 110.

Map data source system 102 may include one or more devices capable of receiving information from and/or communicating information to map database 104, mapping system 106, and/or simulation system 108 (e.g., via communication network 110, another network (e.g., an ad hoc network, a local network, a private network, a virtual private network, and/or the like), and/or any other suitable communication technique). Additionally or alternatively, each map data source system 102 may include a device capable of receiving information from and/or communicating information to other map data source systems 102 (e.g., via communication network 110, another network (e.g., an ad hoc network, a local network, a private network, a virtual private network, and/or the like), and/or any other suitable communication technique). In some non-limiting embodiments or aspects, map data source system 102 may include at least one computing device, such as a vehicle on-board computing device, a portable and/or handheld device (e.g., a computer, a laptop, a personal digital assistant (PDA), a smartphone, a tablet, and/or the like), a desktop computer, a server, a group of servers and/or other like devices. In some non-limiting embodiments or aspects, map data source system 102 may include a vehicle (e.g., an autonomous vehicle), as described herein. For example, the vehicle may include at least one computing device (e.g., a vehicle on-board computing device) and at least one sensor (e.g., a ray casting system such as a LiDAR, a laser scanner, a radar, any combination thereof, and/or the like; an image capture system such as a camera and/or the like; any combination thereof, and/or the like), as described herein. Such a vehicle (e.g., the computing device thereof and/or the like) may be configured to generate map data based on the sensor(s). In some non-limiting embodiments or aspects, map data source system 102 may include a system (e.g., at least one computing device, such as at least one server and/or the like) of a map service provider (e.g., an entity that provide maps and/or map data associated therewith).

In some non-limiting embodiments or aspects, map data source system 102 may obtain (e.g., generate, retrieve, and/or the like) map data associated with at least one map of at least one geographic location (e.g., a geographic location including a roadway), as described herein. Additionally or alternatively, map data source system 102 may store the map data, as described herein. Additionally or alternatively, map data source system 102 may communicate the map data to map database 104, mapping system 106, simulation system 108 and/or the like, as described herein.

Map database 104 may include one or more devices capable of receiving information from and/or communicating information to map data source system 102, mapping system 106, and/or simulation system 108 (e.g., via communication network 110, another network (e.g., an ad hoc network, a local network, a private network, a virtual private network, and/or the like), and/or any other suitable communication technique). In some non-limiting embodiments or aspects, map database 104 may include at least one computing device, such as a server, a group of servers, a desktop computer, a laptop, a portable and/or handheld device (e.g., a computer, a PDA, a smartphone, a tablet, and/or the like), and/or other like devices. In some non-limiting embodiments or aspects, map database 104 may include a system (e.g., at least one computing device, such as at least one server and/or the like) of a map service provider (e.g., an entity that provide maps and/or map data associated therewith). In some non-limiting embodiments or aspects, map database 104 may be in communication with a data storage device, which may be local or remote to map database 104. In some non-limiting embodiments or aspects, map database 104 may be capable of receiving information from, storing information in, communicating information to, or searching information stored in the data storage device.

In some non-limiting embodiments or aspects, map database 104 may store map data associated with at least one map (e.g., a plurality of maps) of at least one geographic location (e.g., a plurality of geographic locations including roadways), as described herein. Additionally or alternatively, map database 104 may obtain (e.g., retrieve and/or the like) map data associated with at least one map, as described herein. Additionally or alternatively, map data source system 102 may communicate the map data associated with at least one map to map data source system 102, mapping system 106, simulation system 108 and/or the like, as described herein.

Mapping system 106 may include one or more devices capable of receiving information from and/or communicating information to map data source system 102, mapping database 104, and/or simulation system 108 (e.g., via communication network 110, another network (e.g., an ad hoc network, a local network, a private network, a virtual private network, and/or the like), and/or any other suitable communication technique). In some non-limiting embodiments or aspects, mapping system 106 may include at least one computing device, such as a server, a group of servers, a desktop computer, a laptop, a portable and/or handheld device (e.g., a computer, a PDA, a smartphone, a tablet, and/or the like), and/or other like devices.

In some non-limiting embodiments or aspects, mapping system 106 may obtain (e.g., receive, retrieve, and/or the like) first map data associated with a first map of a geographic location (e.g., a geographic location including a roadway) from map data source system 102, as described herein. Additionally or alternatively, mapping system 106 may obtain (e.g., receive, retrieve, and/or the like) second map data associated with a second map of the geographic location (e.g., the same geographic location as the first map) from map database 104, as described herein. Additionally or alternatively, mapping system 106 may determine a plurality of non-overlapping areas based on the first map data and second map data, iteratively select non-overlapping areas and warp points therein, and iteratively warp the first map around the selected warp point to increase a total overlapping area between the first and second maps, as described herein.

Simulation system 108 may include one or more devices capable of receiving information from and/or communicating information to map data source system 102, mapping database 104, and/or mapping system 106 (e.g., via communication network 110, another network (e.g., an ad hoc network, a local network, a private network, a virtual private network, and/or the like), and/or any other suitable communication technique). In some non-limiting embodiments or aspects, simulation system 108 may include at least one computing device, such as a server, a group of servers, a desktop computer, a laptop, a portable and/or handheld device (e.g., a computer, a PDA, a smartphone, a tablet, and/or the like), and/or other like devices.

In some non-limiting embodiments or aspects, simulation system 108 may obtain (e.g., receive, retrieve, and/or the like) map data associated with at least one map of at least one geographic location (e.g., a geographic location including a roadway) from mapping system 106, map database 104, and/or map data source system 102, as described herein. Additionally or alternatively, simulation system 108 may use the map data to facilitate at least one simulated autonomous driving operation of a simulated autonomous vehicle, as described herein.

In some non-limiting embodiments or aspects, an autonomous vehicle (e.g., map data source system 102, another autonomous vehicle, and/or the like) may obtain (e.g., receive, retrieve, and/or the like) map data associated with at least one map of at least one geographic location (e.g., a geographic location including a roadway) from mapping system 106 and/or map database 104, as described herein. Additionally or alternatively, the autonomous vehicle may use the map data to facilitate at least one autonomous driving operation of the autonomous vehicle, as described herein.

Communication network 110 may include one or more wired and/or wireless networks. For example, communication network 110 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
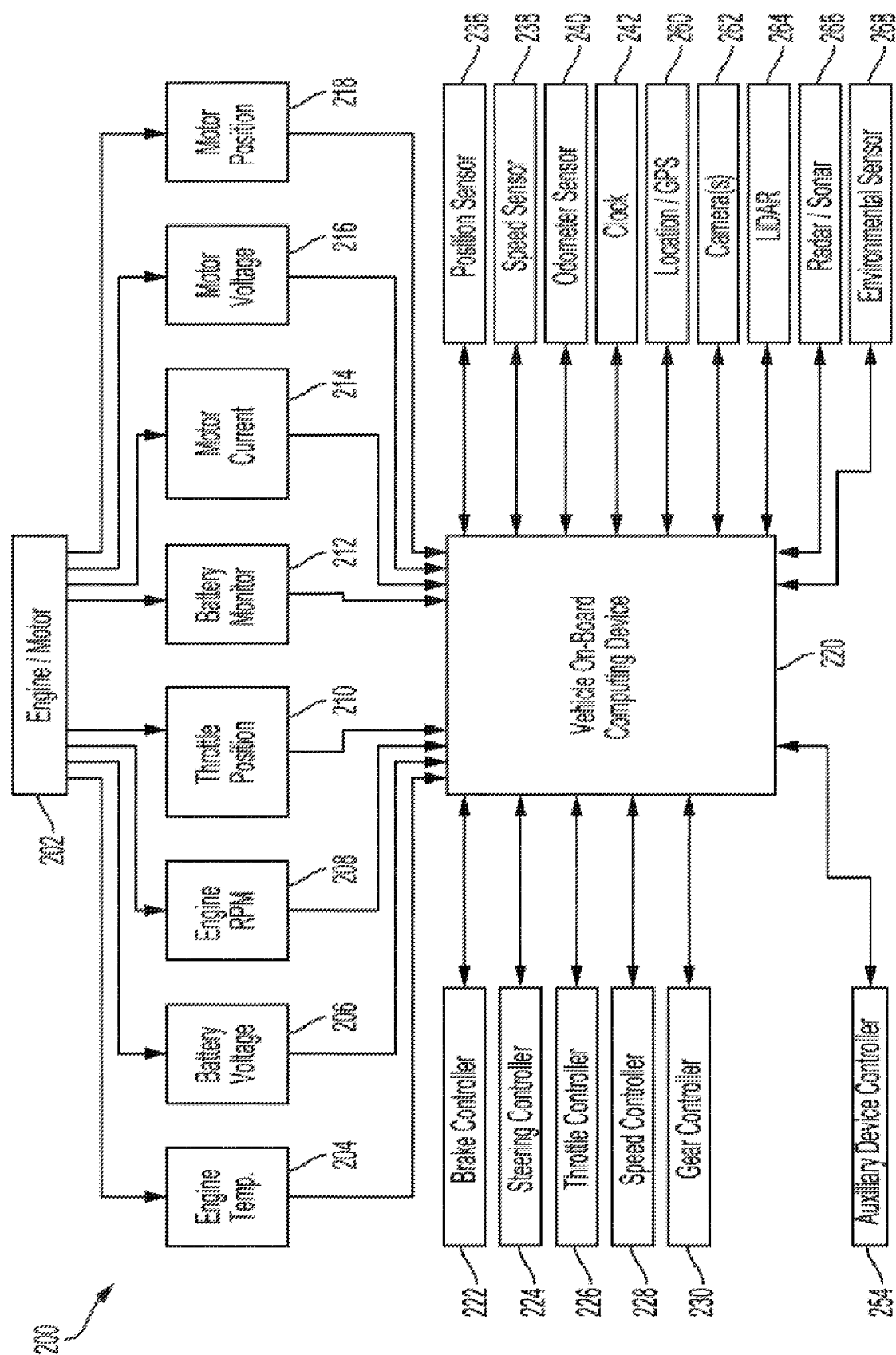
FIG. 2 is an illustration of an illustrative architecture for a vehicle according to the principles of the presently disclosed subject matter.

Referring now to FIG. 2, FIG. 2 is an illustration of an illustrative system architecture 200 for a vehicle. An autonomous vehicle (e.g., map data source system 102 and/or the like) may include a same or similar system architecture as that of system architecture 200 shown in FIG. 2.

As shown in FIG. 2, system architecture 200 may include engine or motor 202 and various sensors 204-218 for measuring various parameters of the vehicle. In gas-powered or hybrid vehicles having a fuel-powered engine, the sensors may include, for example, engine temperature sensor 204, battery voltage sensor 206, engine rotations per minute (RPM) sensor 208, and/or throttle position sensor 210. In an electric or hybrid vehicle, the vehicle may have an electric motor, and may have sensors such as battery monitoring sensor 212 (e.g., to measure current, voltage, and/or temperature of the battery), motor current sensor 214, motor voltage sensor 216, and/or motor position sensors 218, such as resolvers and encoders.

System architecture 200 may include operational parameter sensors, which may be common to both types of vehicles, and may include, for example: position sensor 236 such as an accelerometer, gyroscope and/or inertial measurement unit; speed sensor 238; and/or odometer sensor 240. System architecture 200 may include clock 242 that the system 200 uses to determine vehicle time during operation. Clock 242 may be encoded into the vehicle on-board computing device 220, it may be a separate device, or multiple clocks may be available.

System architecture 200 may include various sensors that operate to gather information about an environment in which the vehicle is operating and/or traveling. These sensors may include, for example: location sensor 260 (e.g., a Global Positioning System (GPS) device); object detection sensors such as one or more cameras 262; LiDAR sensor system 264; and/or radar and/or sonar system 266. The sensors may include environmental sensors 268 such as a precipitation sensor and/or ambient temperature sensor. The object detection sensors may enable the system architecture 200 to detect objects that are within a given distance range of the vehicle in any direction, and the environmental sensors 268 may collect data about environmental conditions within an area of operation and/or travel of the vehicle.

During operation of system architecture 200, information is communicated from the sensors of system architecture 200 to on-board computing device 220. On-board computing device 220 analyzes the data captured by the sensors and optionally controls operations of the vehicle based on results of the analysis. For example, on-board computing device 220 may control: braking via a brake controller 222; direction via steering controller 224; speed and acceleration via throttle controller 226 (e.g., in a gas-powered vehicle) or motor speed controller 228 such as a current level controller (e.g., in an electric vehicle); differential gear controller 230 (e.g., in vehicles with transmissions); and/or other controllers such as auxiliary device controller 254.

Geographic location information may be communicated from location sensor 260 to on-board computing device 220, which may access a map of the environment including map data that corresponds to the location information to determine known fixed features of the environment such as streets, buildings, stop signs and/or stop/go signals. Captured images from cameras 262 and/or object detection information captured from sensors such as LiDAR 264 is communicated from those sensors to on-board computing device 220. The object detection information and/or captured images are processed by on-board computing device 220 to detect objects in proximity to the vehicle. Any known or to be known technique for making an object detection based on sensor data and/or captured images can be used in the embodiments disclosed in this document. On-board computing device 220 may generate new map data (e.g., based on object detection data captured from sensors such as LiDAR 264, captured images from cameras 262, the map data, and/or the like). Additionally or alternatively, On-board computing device 220 may communicate sensor data (e.g., object detection data captured from sensors such as LiDAR 264, captured images from cameras 262, and/or the like) to a remote system (e.g., mapping system 106), which may generate new map data based on the sensor data.

Figure 3:
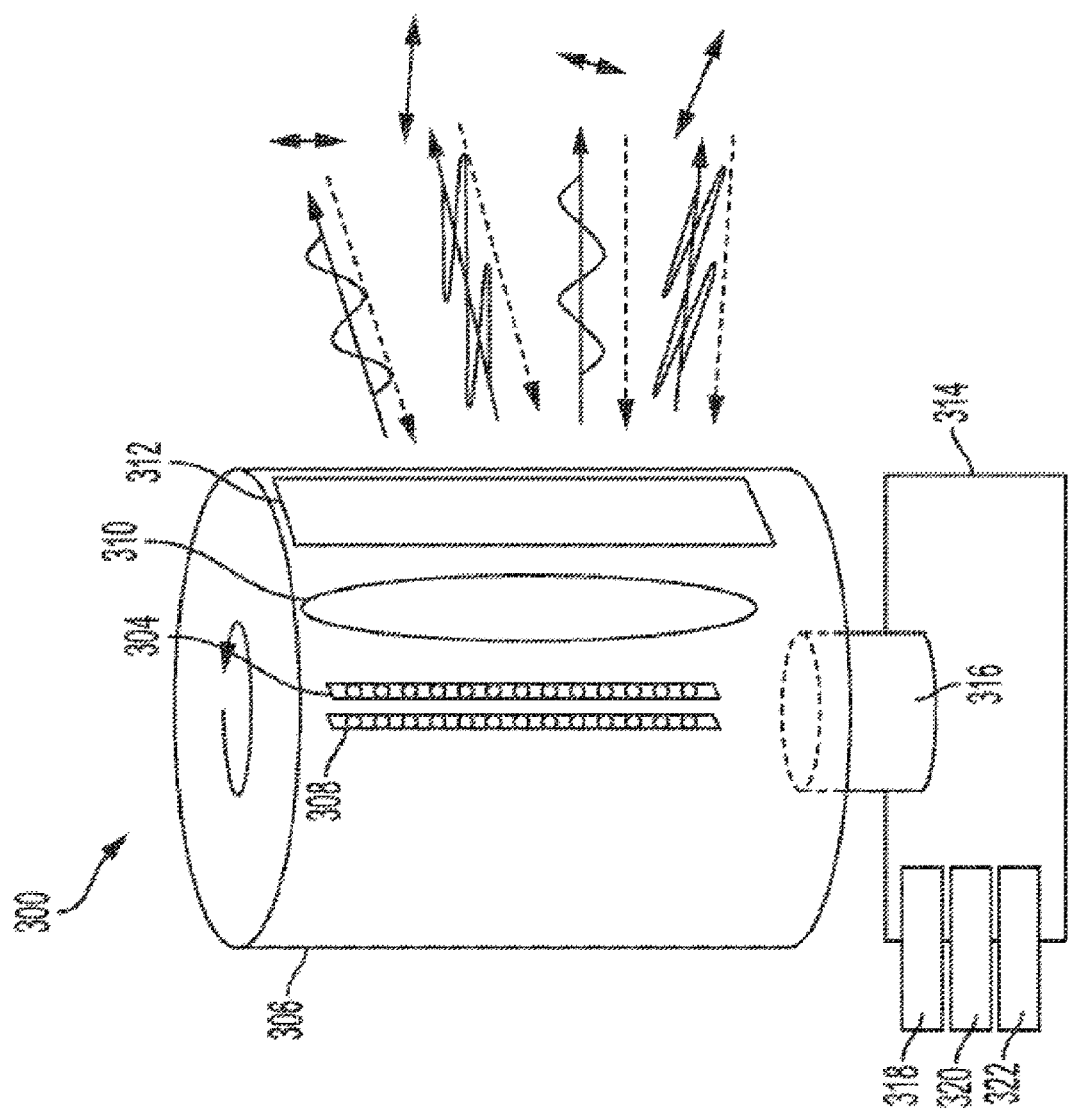
FIG. 3 is an illustration of an illustrative architecture for a LiDAR system according to the principles of the presently disclosed subject matter.

Referring now to FIG. 3, FIG. 3 is an illustration of an illustrative LiDAR system 300. LiDAR system 264 of FIG. 2 may be the same as or substantially similar to LiDAR system 300.

As shown in FIG. 3, LiDAR system 300 may include housing 306, which may be rotatable 360° about a central axis such as hub or axle 316. Housing 306 may include an emitter/receiver aperture 312 made of a material transparent to light. Although a single aperture is shown in FIG. 3, non-limiting embodiments or aspects of the present disclosure are not limited in this regard. In other scenarios, multiple apertures for emitting and/or receiving light may be provided. Either way, LiDAR system 300 can emit light through one or more of aperture(s) 312 and receive reflected light back toward one or more of aperture(s) 312 as housing 306 rotates around the internal components. In an alternative scenario, the outer shell of housing 306 may be a stationary dome, at least partially made of a material that is transparent to light, with rotatable components inside of housing 306.

Inside the rotating shell or stationary dome is a light emitter system 304 that is configured and positioned to generate and emit pulses of light through aperture 312 or through the transparent dome of housing 306 via one or more laser emitter chips or other light emitting devices. Emitter system 304 may include any number of individual emitters (e.g., 8 emitters, 64 emitters, 128 emitters, etc.). The emitters may emit light of substantially the same intensity or of varying intensities. The individual beams emitted by light emitter system 304 may have a well-defined state of polarization that is not the same across the entire array. As an example, some beams may have vertical polarization and other beams may have horizontal polarization. LiDAR system 300 may include light detector 308 containing a photodetector or array of photodetectors positioned and configured to receive light reflected back into the system. Emitter system 304 and light detector 308 may rotate with the rotating shell, or emitter system 304 and light detector 308 may rotate inside the stationary dome of housing 306. One or more optical element structures 310 may be positioned in front of light emitting unit 304 and/or light detector 308 to serve as one or more lenses and/or waveplates that focus and direct light that is passed through optical element structure 310.

One or more optical element structures 310 may be positioned in front of a mirror to focus and direct light that is passed through optical element structure 310. As described herein below, LiDAR system 300 may include optical element structure 310 positioned in front of a mirror and connected to the rotating elements of LiDAR system 300 so that optical element structure 310 rotates with the mirror. Alternatively or in addition, optical element structure 310 may include multiple such structures (e.g., lenses, waveplates, etc.). In some non-limiting embodiments or aspects, multiple optical element structures 310 may be arranged in an array on or integral with the shell portion of housing 306.

In some non-limiting embodiments or aspects, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

LiDAR system 300 may include power unit 318 to power the light emitting unit 304, motor 316, and electronic components. LiDAR system 300 may include an analyzer 314 with elements such as processor 322 and non-transitory computer-readable memory 320 containing programming instructions that are configured to enable the system to receive data collected by the light detector unit, analyze the data to measure characteristics of the light received, and generate information that a connected system can use to make decisions about operating in an environment from which the data was collected. Analyzer 314 may be integral with the LiDAR system 300 as shown, or some or all of analyzer 314 may be external to LiDAR system 300 and communicatively connected to LiDAR system 300 via a wired and/or wireless communication network or link.

Figure 4:
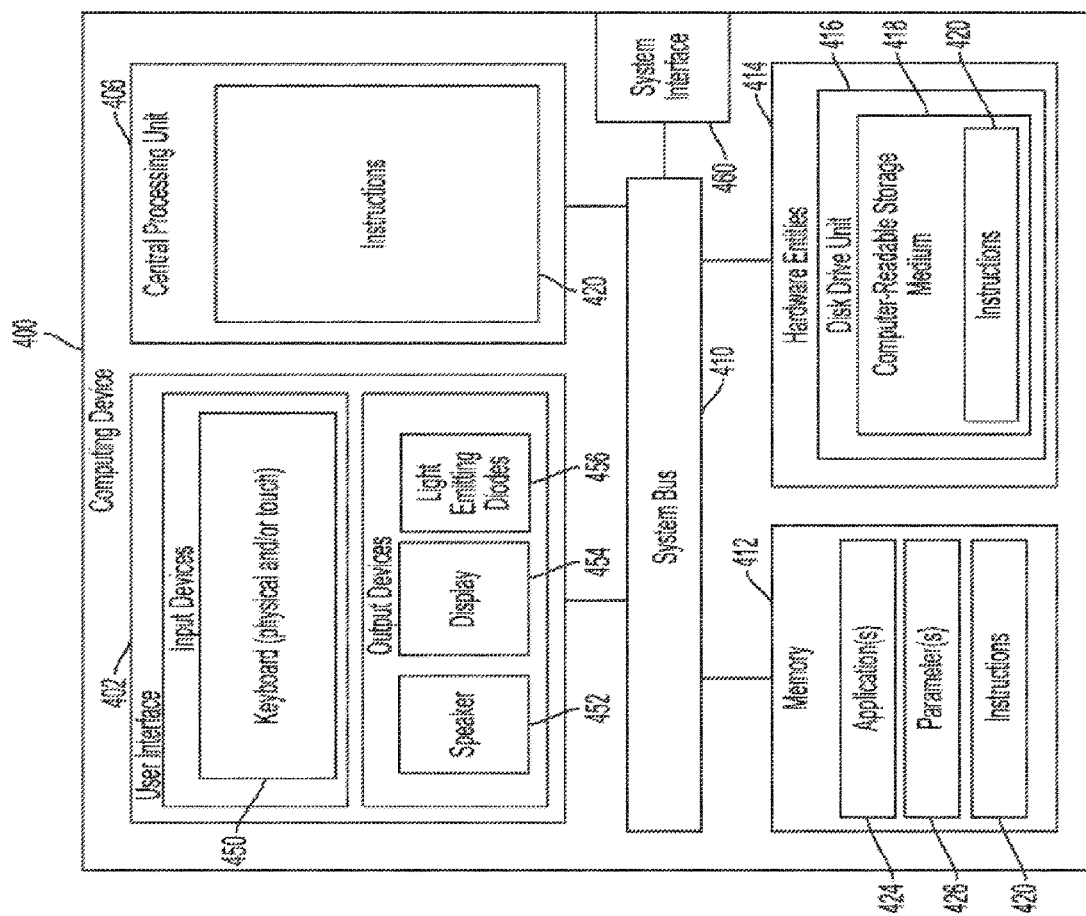
FIG. 4 is an illustration of an illustrative computing device according to the principles of the presently disclosed subject matter.

Referring now to FIG. 4, FIG. 4 is an illustration of an illustrative architecture for a computing device 400. Computing device 400 can correspond to one or more devices of (e.g., one or more devices of a system of) an autonomous vehicle (e.g., one more devices of map data source system 102, one more devices of systems architecture 200, and/or the like), one more devices of map data source system 102, one or more devices of map database 104, one more devices of mapping system 106, and/or one more devices of simulation system 108. In some non-limiting embodiments or aspects, one or more devices of (e.g., one or more devices of a system of) an autonomous vehicle, map data source system 102, map database 104, mapping system 106, and/or simulation system 108 may include at least one computing device 400 and/or at least one component of computing device 400.

The number and arrangement of components shown in FIG. 4 are provided as an example. In some non-limiting embodiments or aspects, computing device 400 may include additional components, fewer components, different components, or differently arranged components than those shown in FIG. 4. Additionally, or alternatively, a set of components (e.g., one or more components) of computing device 400 may perform one or more functions described as being performed by another set of components of device 400.

As shown in FIG. 4, computing device 400 comprises user interface 402, Central Processing Unit (CPU) 406, system bus 410, memory 412 connected to and accessible by other portions of computing device 400 through system bus 410, system interface 460, and hardware entities 414 connected to system bus 410. User interface 402 can include input devices and output devices, which facilitate user-software interactions for controlling operations of the computing device 400. The input devices may include, but are not limited to, physical and/or touch keyboard 450. The input devices can be connected to computing device 400 via a wired and/or wireless connection (e.g., a Bluetooth® connection). The output devices may include, but are not limited to, speaker 452, display 454, and/or light emitting diodes 456. System interface 460 is configured to facilitate wired and/or wireless communications to and from external devices (e.g., network nodes such as access points, etc.).

At least some of hardware entities 414 may perform actions involving access to and use of memory 412, which can be a Random Access Memory (RAM), a disk drive, flash memory, a Compact Disc Read Only Memory (CD-ROM) and/or another hardware device that is capable of storing instructions and data. Hardware entities 414 can include disk drive unit 416 comprising computer-readable storage medium 418 on which is stored one or more sets of instructions 420 (e.g., software code) configured to implement one or more of the methodologies, procedures, or functions described herein. Instructions 420, applications 424, and/or parameters 426 can also reside, completely or at least partially, within memory 412 and/or within CPU 406 during execution and/or use thereof by computing device 400. Memory 412 and CPU 406 may include machine-readable media. The term "machine-readable media," as used herein, may refer to a single medium or multiple media (e.g., a centralized or distributed database, and/or associated caches and server) that store the one or more sets of instructions 420. The term "machine readable media," as used herein, may refer to any medium that is capable of storing, encoding or carrying a set of instructions 420 for execution by computing device 400 and that cause computing device 400 to perform any one or more of the methodologies of the present disclosure.

Referring now to FIG. 5, FIG. 5 is a flowchart of a non-limiting embodiment or aspect of a process 500 for iterative map warping. In some non-limiting embodiments or aspects, one or more of the steps of process 500 may be performed (e.g., completely, partially, and/or the like) by mapping system 106 (e.g., one or more devices of mapping system 106). In some non-limiting embodiments or aspects, one or more of the steps of process 500 may be performed (e.g., completely, partially, and/or the like) by another system, another device, another group of systems, or another group of devices, separate from or including mapping system 106, such as map data source system 102, map database 104, simulation system 108, and/or the like.

As shown in FIG. 5, at step 502, process 500 may include obtaining first map data. For example, mapping system 106 may obtain (e.g., receive, request, retrieve, and/or the like) first map data associated with a first map of a geographic location from map database 104. Additionally or alternatively, map database 104 may communicate the first map data to mapping system 106.

In some non-limiting embodiments or aspects, the geographic location may include a roadway. Additionally or alternatively, the first map data may include at least one first lane segment (e.g., a plurality of first lane segments) representing the roadway. For example, each lane segment may include a polygon (e.g., a rectangle and/or the like) representing a segment of a lane of the roadway.

In some non-limiting embodiments or aspects, the first map data may include first vector map data associated with a first vector map of the geographic location (e.g., the lane segments of the roadway therein).

As shown in FIG. 5, at step 504, process 500 may include obtaining second map data. For example, mapping system 106 may obtain (e.g., receive, request, retrieve, and/or the like) second map data associated with a second map of the geographic location from map data source system 102. Additionally or alternatively, map data source system 102 may communicate the second map data to mapping system 106.

In some non-limiting embodiments or aspects, the geographic location may include a roadway, as described herein. Additionally or alternatively, the second map data may include at least one second lane segment (e.g., a plurality of second lane segments) representing the roadway. For example, each lane segment may include a polygon (e.g., a rectangle and/or the like) representing a segment of a lane of the roadway.

In some non-limiting embodiments or aspects, the second map data may include second vector map data associated with a second vector map of the geographic location (e.g., the lane segments of the roadway therein).

As shown in FIG. 5, at step 506, process 500 may include determining at least one non-overlapping area. For example, mapping system 106 may determine a plurality of non-overlapping areas based on the at least one first lane segment and the at least one second lane segment.

In some non-limiting embodiments or aspects, mapping system 106 may determine the plurality of non-overlapping areas by determining the symmetric difference of the first lane segment(s) and the second lane segment(s).

In some non-limiting embodiments or aspects, the at least one first lane segment may include a plurality of first lane segments and the at least one second lane segment may include a plurality of second lane segments. Additionally or alternatively, determining the plurality of non-overlapping areas may include merging (e.g., by mapping system 106) the plurality of first lane segments to provide a first polygon (e.g., representing the roadway depicted in the first map as a whole). For example, merging the plurality of first lane segments may include expanding the first lane segments (e.g., rectangles and/or the like) by a selectable amount (e.g., a selectable threshold amount, a buffer area, and/or the like) and intersecting the expanded first lane segments (e.g., expanded rectangles) to form the first polygon. For example, the selectable amount may include an amount sufficient to make any logically adjacent lane segments overlap, which may result in such lane segments being merged into a polygon. Additionally or alternatively, mapping system 106 may merge the plurality of second lane segments to provide a second polygon (e.g., representing the roadway depicted in the second map as a whole). For example, merging the plurality of second lane segments may include expanding the second lane segments (e.g., rectangles and/or the like) by a selectable amount (e.g., a selectable threshold amount, a buffer area, and/or the like) and intersecting the expanded second lane segments (e.g., expanded rectangles) to form the second polygon. Additionally or alternatively, mapping system 106 may determine at least one first area of the first polygon that does not overlap the second polygon and/or at least one second area of the second polygon that does not overlap the first polygon. For example, mapping system 106 may determine the first area(s) and/or the second area(s) by determining the symmetric difference of the first polygon and the second polygon. Additionally or alternatively, mapping system 106 may determine the first area(s) and/or the second area(s) by determining the union of the first polygon and the second polygon and subtracting therefrom the intersection of the first polygon and the second polygon. In some non-limiting embodiments or aspects, the plurality of non-overlapping areas may include the first area(s) and/or the second area(s).

As shown in FIG. 5, at step 508, process 500 may include selecting a non-overlapping area. For example, mapping system 106 may select a first non-overlapping area of the plurality of non-overlapping areas.

In some non-limiting embodiments or aspects, selecting the first non-overlapping area may include determining (e.g., by mapping system 106) an area of each non-overlapping area of the plurality of non-overlapping areas. For example, the area of each non-overlapping area may be the geometric area (e.g., which may be calculated by mapping system 106). Additionally or alternatively, the area of each non-overlapping area may be determined by integrating (e.g., by mapping system 106) across each non-overlapping area (e.g., working across the edge(s) thereof and/or the like). In some non-limiting embodiments, mapping system 106 may select a non-overlapping area of the plurality of non-overlapping areas having a greatest area as the first non-overlapping area.

As shown in FIG. 5, at step 510, process 500 may include selecting a warp point. For example, mapping system 106 may select a first warp point within the first non-overlapping area.

In some non-limiting embodiments or aspects, selecting the first warp point may include determining (e.g., by mapping system 106) a centroid of the first non-overlapping area. For example, the centroid may be the geometric center of the first non-overlapping area (e.g., which may be calculated by mapping system 106). Additionally or alternatively, mapping system may select the centroid as the first warp point.

As shown in FIG. 5, at step 512, process 500 may include warping around the warp point. For example, mapping system 106 may warp the first lane segment(s) (e.g., the first polygon including the first lane segment(s)) around the first warp point. Additionally or alternatively, mapping system 106 may warp the second lane segment(s) (e.g., the second polygon including the second lane segment(s)) around the first warp point.

In some non-limiting embodiments, mapping system 106 may warp the first lane segment(s) (e.g., the first polygon including the first lane segment(s)) around the first warp point to increase a total overlapping area based on the second lane segment(s) (e.g., the second polygon including the second lane segment(s)) and the first lane segment(s) (e.g., the first polygon including the first lane segment(s)) after warping. Additionally or alternatively, mapping system 106 may warp the first lane segment(s) (e.g., the first polygon including the first lane segment(s)) around the first warp point to reduce the first non-overlapping area.

In some non-limiting embodiments, warping the first lane segment(s) (e.g., the first polygon including the first lane segment(s)) may include adjusting (e.g., by mapping system 106) the first warp point and points (e.g., of the first lane segment(s) and/or the first polygon) around the first warp point using inverse distance weighted interpolation. For example, the first warp point may be adjusted by a selectable step size (e.g., 1 m, 2 m, 4 m, 5 m, 8 m and/or the like) in at least one direction (e.g., a plurality of directions, such as four directions (e.g., north, south, east, and west and/or the like)) to at least one adjusted position (e.g., a plurality of adjusted positions, such as four adjusted positions (e.g., one step north, one step south, one step east, and one step west and/or the like)), and the points around the first warp point may be adjusted by inverse distance weighted interpolation around each adjusted position of the first warp point (e.g., based on a power parameter for the inverse distance weighted interpolation (e.g., a power parameter of 2 and/or the like)). In some non-limiting embodiments, the selectable step size may include a range of values, which may decreases as iteration count increases (e.g., to fine tune the optimization). For example, the boundaries of such a range may be less than a maximum expected deviation in map coordinates and/or may be large enough so that the optimization may be performed efficiently. In some non-limiting embodiments, the power parameter of 2 may be chosen for efficiency in the calculation (e.g., because this may allow taking a shortcut by allowing a square root in a distance calculation to cancel out an exponentiation of the inverse distance weighted interpolation). Additionally or alternatively, a range of values may be used for the power parameter (e.g., for experimentation to see which power parameter may produce a most desirable result). Additionally or alternatively, mapping system 106 may determine the total overlapping area based on the second lane segment(s) (e.g., the second polygon including the second lane segment(s)) and the first lane segment(s) (e.g., the first polygon including the first lane segment(s)) after the adjusting (e.g., after each of the plurality of (e.g., four) adjustments). For example, mapping system 106 may determine the total overlapping area based on the intersection of the second polygon and the warped first polygon and/or the like. Additionally or alternatively, mapping system 106 may iteratively repeat the adjusting (e.g., starting from the adjusted position of the first warp point that resulted in the greatest total overlapping area) and the determining of the total overlapping area until a termination condition is satisfied. For example, the termination condition may include at least one of the total overlapping area reaching a local maximum (e.g., the total overlapping area does not increase between successive iterations and/or the like), the total overlapping area satisfying a threshold (e.g., exceeded a selectable threshold and/or the like), the total area of the symmetric difference (e.g., non-overlapping area) satisfying a threshold (e.g., being less than a minimum threshold, which may be associated with the lane segments/polygons being close enough to each other), a threshold number of iterations being satisfied (e.g., exceeding a selectable threshold number of iterations and/or the like), any combination thereof, and/or the like. For example, mapping system 106 may iteratively repeat the adjusting and the determining of the total overlapping area until the total overlapping area reaches a local maximum. In some non-limiting embodiments, any of the aforementioned thresholds may be determined by the acceptable subjective tolerance for deviation in the warped map.

In some non-limiting embodiments, mapping system 106 may iteratively repeat steps 506-512. For example, mapping system 106 may determine a further plurality of non-overlapping areas based on the first lane segment(s) (e.g., the first polygon including the first lane segments) after the warping and the second lane segment(s) (e.g., the second polygon including the second lane segments), as described herein (e.g., step 506). Additionally or alternatively, mapping system 106 may select a further non-overlapping area of the further plurality of non-overlapping areas, as described herein (e.g., step 508). Additionally or alternatively, mapping system 106 may select a further warp point within the further non-overlapping area, as described herein (e.g., step 510). In some non-limiting embodiments or aspects, if the centroid of the further non-overlapping area is within a threshold distance (e.g., a selectable threshold distance, such as 1 m, 5 m, and/or the like) from a previous warp point, the previous warp point may be selected as the further warp point (e.g., rather than the centroid). Additionally or alternatively, mapping system 106 may warp the first lane segment(s) (e.g., the first polygon including the first lane segments) around the further warp point (e.g., iteratively repeat the warping until a termination condition is satisfied, such as until the total overlapping area reaches a local maximum), as described herein (e.g., step 512). Additionally or alternatively, mapping system 106 may iteratively repeat steps 506-512 until a second termination condition is satisfied. For example, the second termination condition may include at least one of the total overlapping area reaching a local maximum, the improvement of the total overlapping area between successive iterations satisfying a threshold (e.g., being less than a selectable threshold and/or the like), the total area of the symmetric difference (e.g., non-overlapping area) satisfying a threshold (e.g., being less than a minimum threshold, which may be associated with the lane segments/polygons being close enough to each other), a threshold number of iterations being satisfied (e.g., exceeding a selectable threshold number of iterations and/or the like), any combination thereof, and/or the like. In some non-limiting embodiments, any of the aforementioned thresholds may be determined by the acceptable subjective tolerance for deviation in the warped map.

In some non-limiting embodiments or aspects, the warping around the warp points may provide a continuous function (e.g., a continuous function F(x,y) and/or the like) by which any position on the first map may be transformed to a position on the second map (e.g., without relying on the specific lane segmentation in the first or second maps). For example, the continuous function may include at least one inverse distance weighted interpolation around at least one warp point (e.g., a plurality of inverse distance weighted interpolations around a plurality of warp points, each of which may be a continuous function, which may combine to provide the final continuous function). For example, each warp point may include an x position and a y position in the first map and/or at least one warping value (e.g., an x warping value, a y warping value, any combination thereof, and/or the like) representing how much the position in the first map should be transformed (e.g., warped) to be transformed to the second map.

In some non-limiting embodiments or aspects, the first map data (e.g., the first lane segment(s) after the warping and/or the like) may be used to facilitate at least one autonomous driving operation of an autonomous vehicle or to facilitate at least one simulated autonomous driving operation of a simulated autonomous vehicle. For example, mapping system 106 may communicate map data (e.g., associated with the first map after warping) to an autonomous vehicle (e.g., map data source system 102, another autonomous vehicle, and/or the like). Additionally or alternatively, the autonomous vehicle may use the map data to facilitate at least one autonomous driving operation, such as by using the first map data to localize the autonomous vehicle in a geographic area in which the autonomous vehicle is located and/or to utilize the lane segments of the first map data to control or direct the position of the autonomous vehicle. By way of further example, mapping system 106 may communicate map data (e.g., associated with the first map after warping) to simulation system 108. Additionally or alternatively, simulation system 108 may use the map data to facilitate at least one simulated autonomous driving operation of a simulated autonomous vehicle. Additionally or alternatively, the first map data (e.g., the first lane segment(s) after the warping and/or the like) may be used to generate a map that can be displayed on a GUI, such as a GUI populated on display 454 of an autonomous vehicle. The displayed map may include, among other features, the first lane segment(s) after warping has occurred.

Referring now to FIGS. 6A-6F, FIGS. 6A-6F are diagrams of an exemplary implementation 600 of a non-limiting embodiment or aspect relating to process 500 shown in FIG. 5. In some non-limiting embodiments or aspects, one or more of the steps of implementation 600 may be performed (e.g., completely, partially, and/or the like) by mapping system 106 (e.g., one or more devices of mapping system 106). In some non-limiting embodiments or aspects, one or more of the steps of implementation 600 may be performed (e.g., completely, partially, and/or the like) by another system, another device, another group of systems, or another group of devices, separate from or including mapping system 106, such as map data source system 102, map database 104, simulation system 108, and/or the like.

Figure 6B:
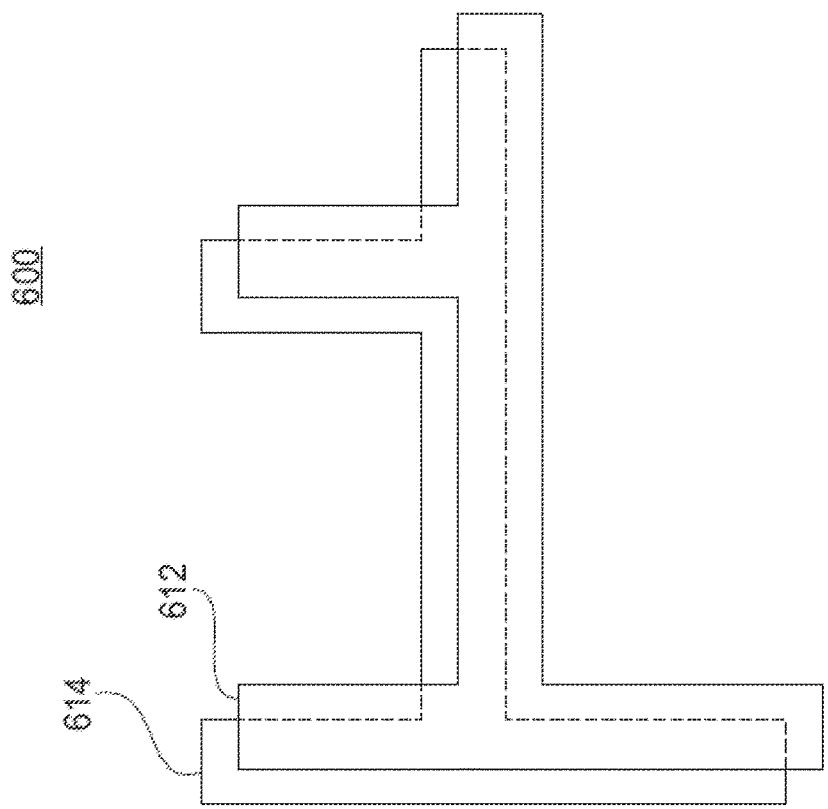
FIGS. 6A-6F are diagrams of an exemplary implementation of a non-limiting embodiment or aspect of the process shown in FIG. 5 according to the principles of the presently disclosed subject matter.
Figure 6A:
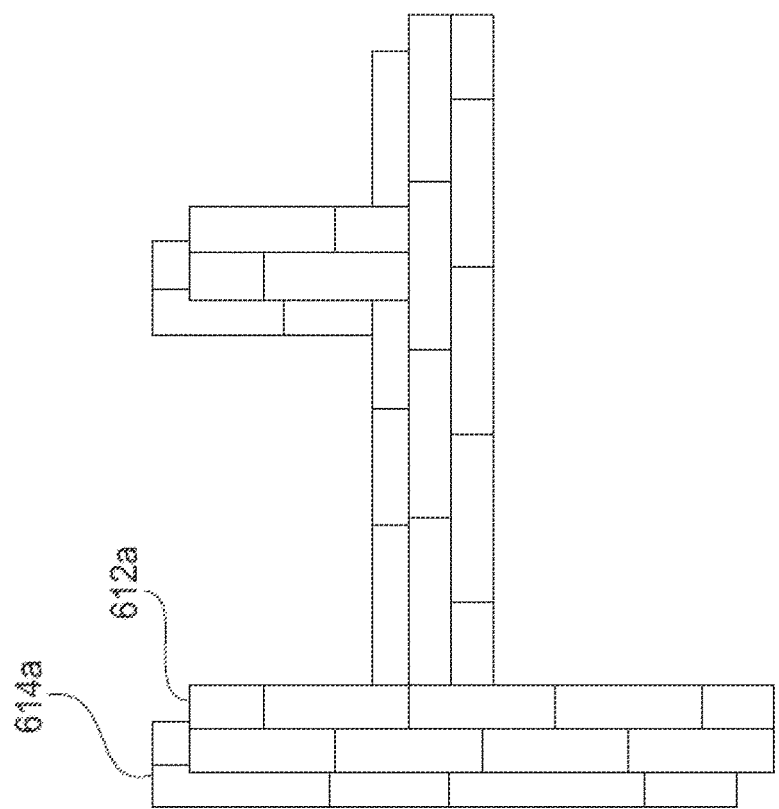

As shown in FIG. 6A, implementation 600 may include obtaining map data. For example, mapping system 106 may obtain first map data including a plurality of first lane segments 612a and/or second map data including a plurality of second lane segments 614a, as described herein.

As shown in FIG. 6B, implementation 600 may include merging lane segments to provide at least one polygon. For example, mapping system 106 may merge the plurality of first lane segments to provide a first polygon 612 and/or merge the plurality of second lane segments to provide a second polygon 614, as described herein.

Figure 6D:
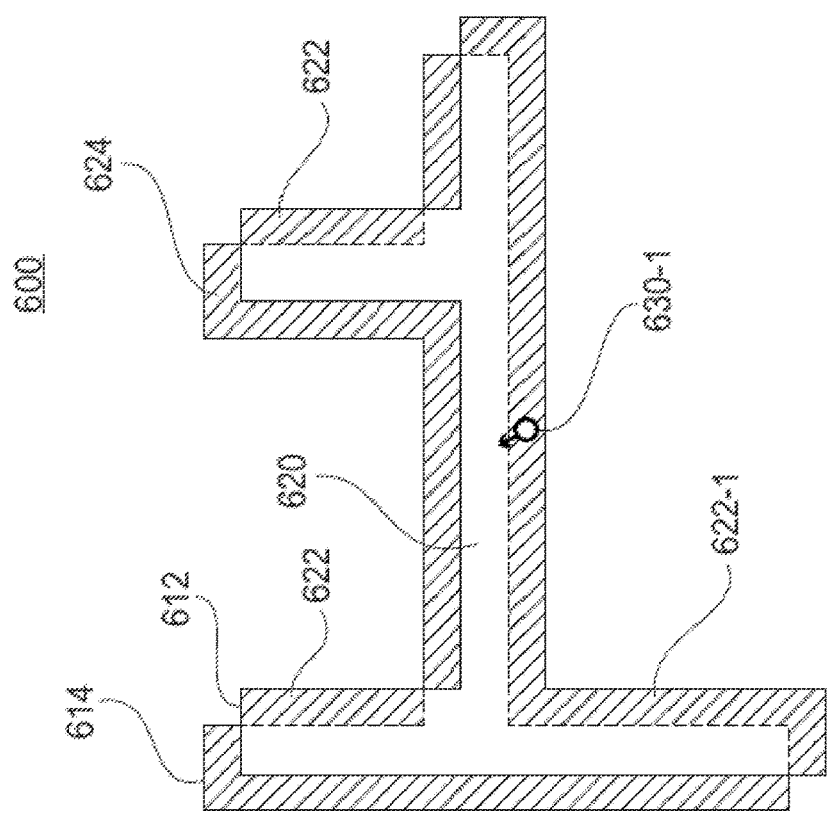
Figure 6C:
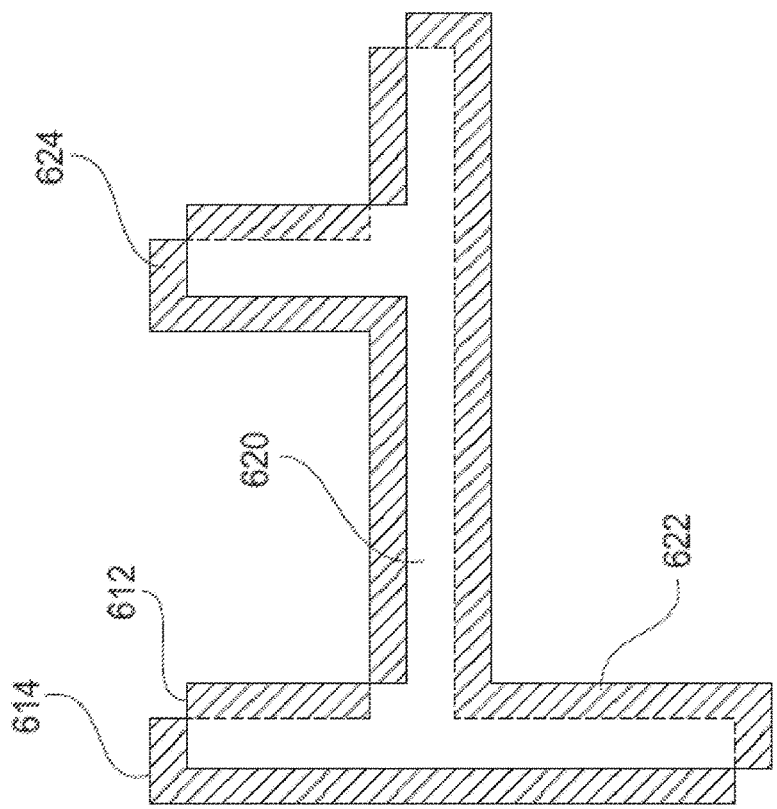

As shown in FIG. 6C, implementation 600 may include determining at least one non-overlapping area. For example, mapping system 106 may determine a plurality of non-overlapping areas (e.g., first areas 622, second areas 624, and/or the like) based on first polygon 612 and second polygon 614. In some non-limiting embodiments, mapping system 106 may determine a symmetric difference between first polygon 612 and second polygon 614 to provide the non-overlapping areas (e.g., first areas 622, second areas 624, and/or the like), as described herein. Additionally or alternatively, mapping system 106 may determine at least one first area 622 of first polygon 612 that does not overlap second polygon 614 and/or at least one second area 624 of second polygon 614 that does not overlap first polygon 612, as described herein. In some non-limiting embodiments or aspects, mapping system 106 may determine at least one overlapping area 620 (e.g., based on the intersection of first polygon 612 and second polygon 614 and/or the like), as described herein.

As shown in FIG. 6D, implementation 600 may include selecting one of the non-overlapping areas and/or selecting a warp point therein. For example, mapping system 106 may select first non-overlapping area 622-1 (e.g., from among the plurality of first areas 622 and plurality of second areas 624 because first non-overlapping area 622-1 has a greatest area and/or the like), as described herein. Additionally or alternatively, mapping system 106 may select first warp point 630-1 within first non-overlapping area 622-1 (e.g., based on determining the centroid of first non-overlapping area 622-1 and selecting the centroid as the first warp point 630-1), as described herein.

Figure 6F:
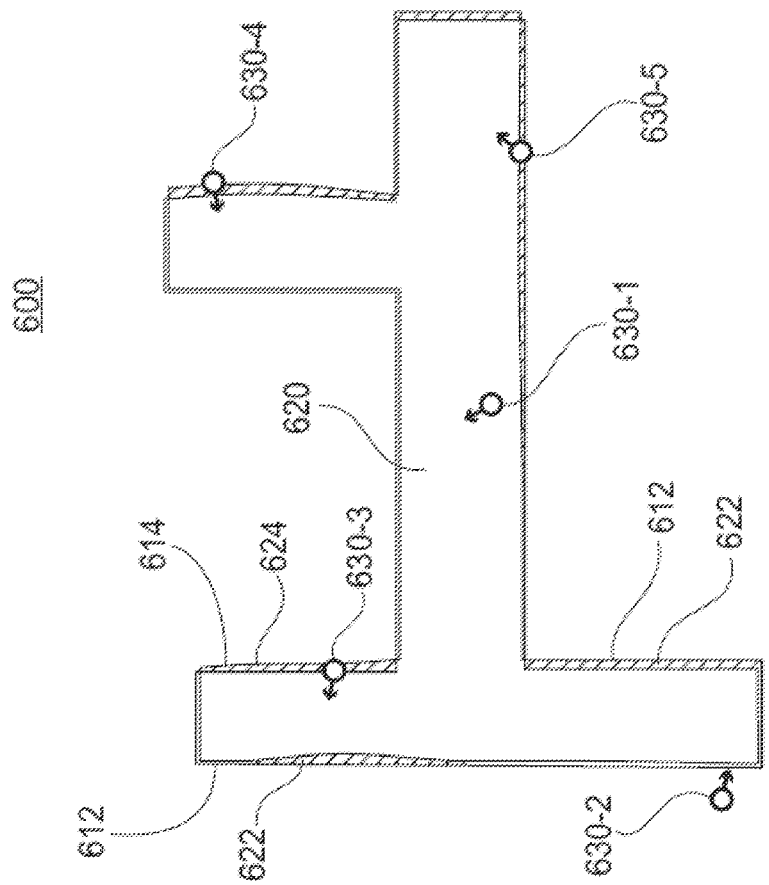
Figure 6E:
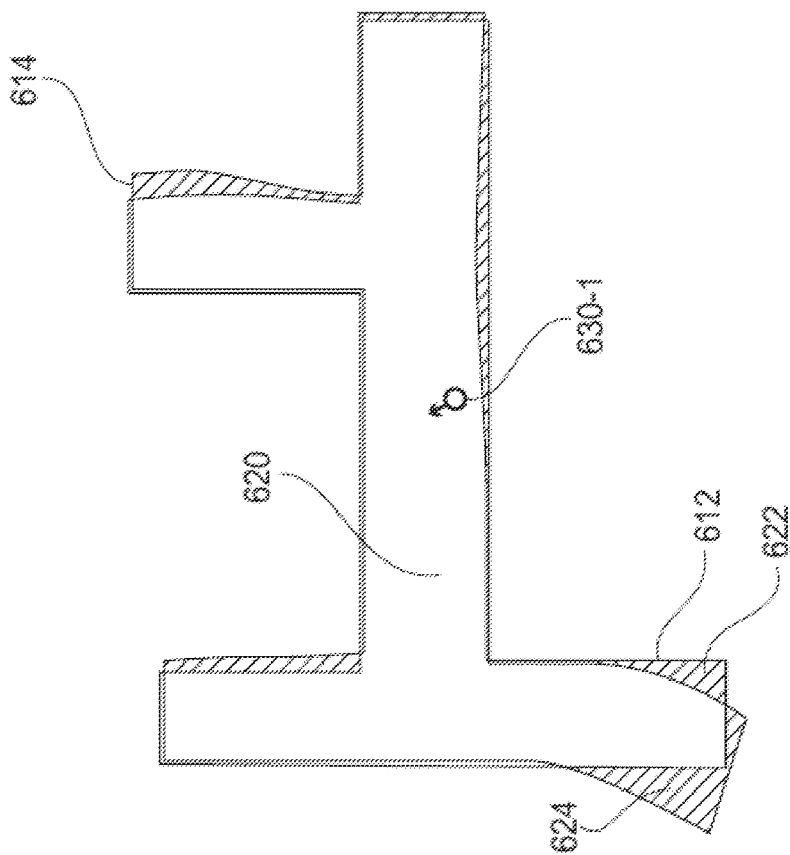

As shown in FIG. 6E, implementation 600 may include warping around the warp point. For example, mapping system 106 may warp first polygon 612 around first warp point 630-1 (e.g., using inverse distance weighted interpolation), as described herein. Additionally or alternatively, mapping system 106 may iteratively repeat the warping until a termination condition is satisfied (e.g., increasing the total overlapping area 620 of first polygon 612 and second polygon 614 until the total overlapping area 620 reaches a local maximum), as described herein.

As shown in FIG. 6F, implementation 600 may include iteratively repeating the determining of the non-overlapping areas, the selecting of one of the non-overlapping areas, the selecting of a warp point within the selected non-overlapping area, and the warping around the selected warp point. For example, mapping system 106 may iteratively repeat the determining of the non-overlapping areas (e.g., first areas 622 and/or second areas 624), the selecting of one of the non-overlapping areas, the selecting of a warp point (e.g., 630-1, 630-2, 630-3, 630-4, 630-5, and/or the like) within the selected non-overlapping area, and the warping around the selected warp point until a termination condition is satisfied (e.g., increasing the total overlapping area 620 of first polygon 612 and second polygon 614 until the total overlapping area 620 reaches a local maximum), as described herein.

Figure 7A:
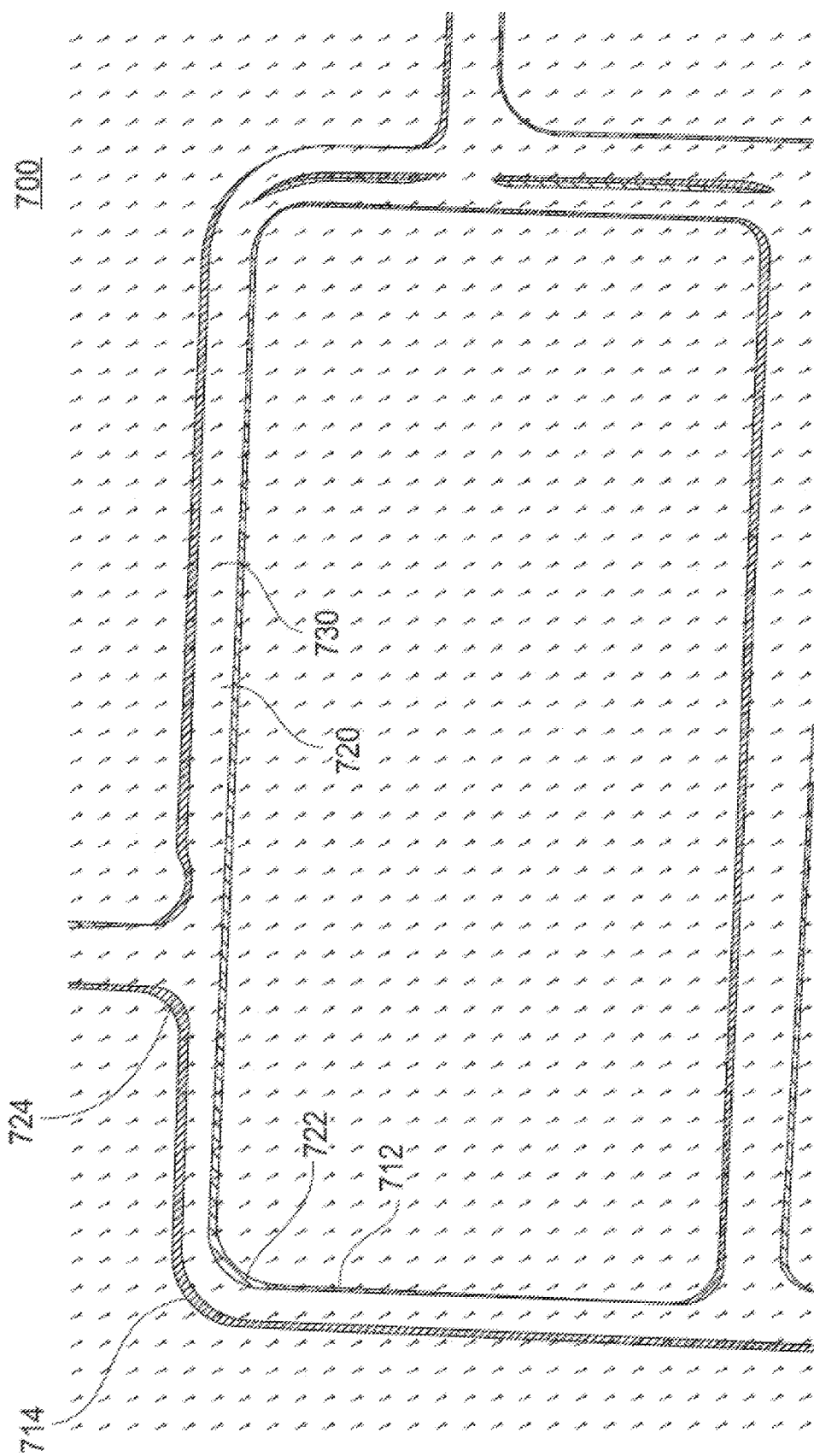
FIGS. 7A and 7B are screenshots of an exemplary implementation of a non-limiting embodiment or aspect of the process shown in FIG. 5 according to the principles of the presently disclosed subject matter.
Figure 7B:
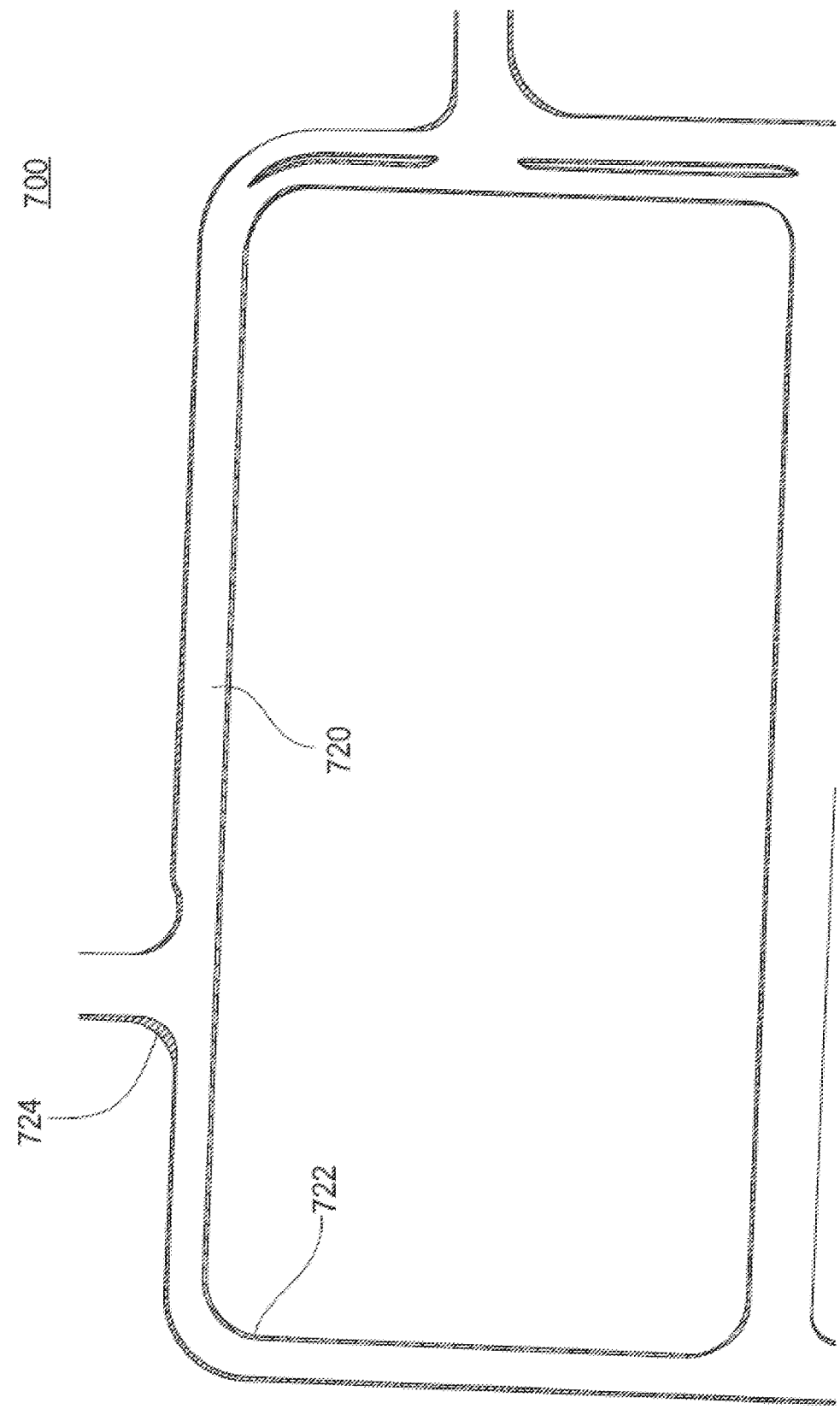

Referring now to FIGS. 7A and 7B, FIGS. 7A and 7B are screenshots of an exemplary implementation 700 of a non-limiting embodiment or aspect relating to process 500 shown in FIG. 5. In some non-limiting embodiments or aspects, one or more of the steps of implementation 700 may be performed (e.g., completely, partially, and/or the like) by mapping system 106 (e.g., one or more devices of mapping system 106). In some non-limiting embodiments or aspects, one or more of the steps of implementation 700 may be performed (e.g., completely, partially, and/or the like) by another system, another device, another group of systems, or another group of devices, separate from or including mapping system 106, such as map data source system 102, map database 104, simulation system 108, and/or the like. In some non-limiting embodiments, screenshots like those shown in FIGS. 7A and 7B can be displayed on a GUI, such as a GUI populated on display 454 of an autonomous vehicle (e.g., map data source system 102, another autonomous vehicle, and/or the like) or in a test environment (e.g., simulation system 108 and/or the like), to illustrate the process and effect of certain non-limiting embodiments or aspects relating to the process 500 shown in FIG. 5. For example, map data can be visually displayed on a GUI and the displayed map data can illustrate any transformations between a first map and a second map (e.g., warping transformations). Any such transformation can be illustrated by, for example, identifying differences between the first map and second map using visually indicators (e.g. color combinations, cross-hatching, etc.), such as visual indicators that indicate any differences in the lane segments that resulted from warping.

As shown in FIG. 7A, first polygon 712 and second polygon 714 may include overlapping area 720 and at least one non-overlapping area (e.g., first areas 722 of first polygon 712 that do not overlap second polygon 714 and/or second areas 724 of second polygon 714 that do not overlap first polygon 712), as described herein. Additionally or alternatively, vectors 730 may represent a magnitude of warping for each respective point determined based on iterative warping (e.g., process 500, implementation 600, and/or the like), as described herein.

As shown in FIG. 7B, after warping, overlapping area 720 between first polygon 712 and second polygon 714 may be increased, as described herein. Additionally or alternatively, the non-overlapping areas (e.g., first areas 722 and/or second areas 724) may be reduced, as described herein.

Figure 8:
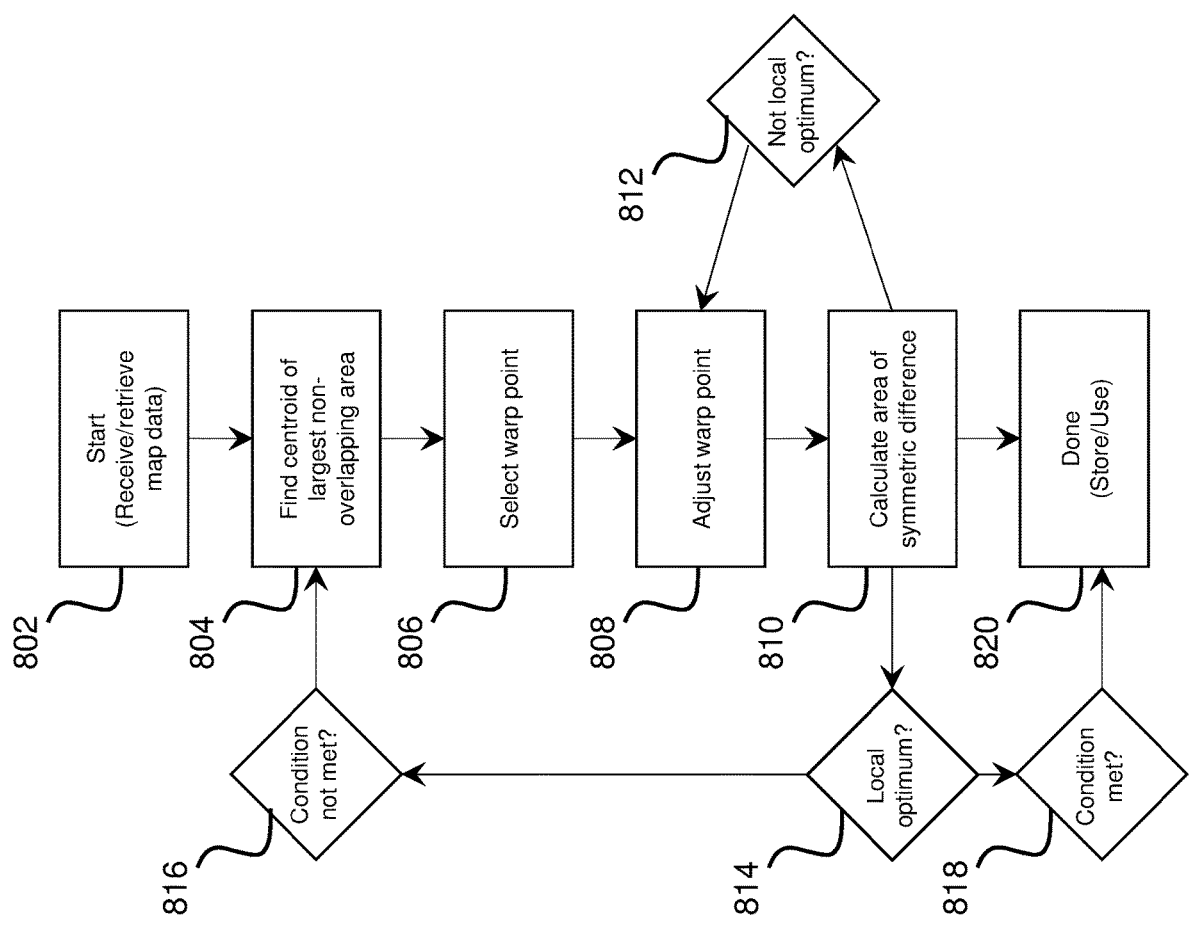
FIG. 8 is a flowchart of an exemplary implementation of a non-limiting embodiment or aspect of the process shown in FIG. 5 according to the principles of the presently disclosed subject matter.

Referring now to FIG. 8, FIG. 8 is a flowchart of an exemplary implementation 800 of a non-limiting embodiment or aspect relating to process 500 shown in FIG. 5. In some non-limiting embodiments or aspects, one or more of the steps of implementation 800 may be performed (e.g., completely, partially, and/or the like) by mapping system 106 (e.g., one or more devices of mapping system 106). In some non-limiting embodiments or aspects, one or more of the steps of implementation 800 may be performed (e.g., completely, partially, and/or the like) by another system, another device, another group of systems, or another group of devices, separate from or including mapping system 106, such as map data source system 102, map database 104, simulation system 108, and/or the like.

As shown in FIG. 8, at step 802, implementation 800 may include starting. For example, starting may include mapping system obtaining map data. For example, mapping system 106 may obtain first map data including a plurality of first lane segments and/or second map data including a plurality of second lane segments, as described herein.

As shown in FIG. 8, at step 804, implementation 800 may include selecting a potential warp point, e.g., by finding the centroid of the largest non-overlapping area. For example, mapping system 106 may determine at least on non-overlapping area, as described herein. Additionally or alternatively, mapping system 106 may select a non-overlapping area (e.g., the largest non-overlapping area and/or the like) from the plurality of non-overlapping areas, as described herein. Additionally or alternatively, mapping system 106 may select a potential warp point (e.g., the centroid) in the selected non-overlapping area, as described herein.

As shown in FIG. 8, at step 806, implementation 800 may include selecting a warp point. For example, the potential warp point (e.g., the centroid of the selected (e.g., largest) non-overlapping area) may be selected as the warp point, as described herein. Additionally or alternatively, if the potential warp point is within a threshold distance from a previous warp point, the previous warp point may be selected as the warp point, as described herein.

As shown in FIG. 8, at step 808, implementation 800 may include adjusting the warp point. For example, mapping system 106 may adjust the warp point, as described herein. Additionally or alternatively, the first map (e.g., the first lane segment(s) and/or a first polygon including the first lane segment(s)) may be adjusted around the first warp point (e.g., based on inverse distance weighted interpolation and/or the like), as described herein.

As shown in FIG. 8, at step 810, implementation 800 may include determining at least one further non-overlapping area, e.g., by calculating the symmetric difference between the first map (after warping/adjusting) and the second map, as described herein. For example, mapping system 106 may determine at least one further non-overlapping area based on the first map (after warping/adjusting) and the second map, as described herein. Additionally or alternatively, mapping system 106 may determine whether a local optimum condition is satisfied (e.g., whether the total overlapping area has reached a local maximum, whether the non-overlapping area has reached a local minimum, and/or the like), as described herein. If the local optimum condition is not satisfied, process 800 may proceed through step 812 to iteratively repeat steps 808 and 810. If the local optimum condition is satisfied, process 800 may proceed to step 814.

As shown in FIG. 8, at step 814, implementation 800 may include determining whether a condition is satisfied (e.g., met and/or the like). For example, mapping system 106 may determine whether a termination condition is satisfied, as described herein. For example, the termination condition may include at least one of the total overlapping area reaching a local maximum, the improvement of the total overlapping area between successive iterations satisfying a threshold (e.g., being less than a selectable threshold and/or the like), a threshold number of iterations being satisfied (e.g., exceeding a selectable threshold number of iterations and/or the like), any combination thereof, and/or the like. If the condition is not satisfied, process 800 may proceed through step 816 to iteratively repeat steps 804-810. If the condition is satisfied, process 800 may proceed through step 818 to step 820.

As shown in FIG. 8, at step 820, implementation 800 may finish. For example, mapping system 106 may store the map data (e.g., associated with the first map after warping) and/or may communicate the map data, as described herein. For example, mapping system 106 may communicate the map data to map database 104 for storage, to an autonomous vehicle (e.g., map data source system 102, another autonomous vehicle, and/or the like) to facilitate the display of a map on a display of autonomous vehicle and/or to facilitate at least one autonomous driving operation of the autonomous vehicle, and/or to simulation system 108 to facilitate at least one simulated autonomous driving operation of a simulated autonomous vehicle, as described herein.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment or aspect can be combined with one or more features of any other embodiment or aspect.

What is claimed is:

1. A method for generating an updated map for use with an autonomous vehicle driving operation or a simulation thereof, comprising:

obtaining, with at least one processor, first map data associated with a first map of a geographic location comprising a roadway, the first map data comprising at least one first lane segment representing the roadway;

obtaining, with the at least one processor, second map data associated with a second map of the geographic location, the second map data comprising at least one second lane segment representing the roadway;

determining, with the at least one processor, a plurality of non-overlapping areas based on the at least one first lane segment and the at least one second lane segment;

selecting, with the at least one processor, a first non-overlapping area of the plurality of non-overlapping areas;

selecting, with the at least one processor, a first warp point within the first non-overlapping area; and warping, with the at least one processor, the at least one first lane segment around the first warp point to increase a total overlapping area based on the at least one second lane segment and the at least one first lane segment after warping to generate updated map data associated with an updated map of the geographic location comprising the roadway, wherein warping the at least one first lane segment comprises:

adjusting, with the at least one processor, the first warp point and points of the at least one first lane segment around the first warp point using inverse distance weighted interpolation;

determining, with the at least one processor, the total overlapping area based on the at least one second lane segment and the at least one first lane segment after the adjusting; and iteratively repeating the adjusting and the determining of the total overlapping area until the total overlapping area reaches a local maximum.

2. The method of claim 1, wherein the first map data comprises first vector map data associated with a first vector map of the geographic location and the second map data comprises second vector map data associated with a second vector map of the geographic location.

3. The method of claim 1, wherein determining the plurality of non-overlapping areas comprises determining the symmetric difference of the at least one first lane segment and the at least one second lane segment.

4. The method of claim 1, wherein the at least one first lane segment comprises a plurality of first lane segments and the at least one second lane segment comprises a plurality of second lane segments, wherein determining the plurality of non-overlapping areas comprises:

merging, with the at least one processor, the plurality of first lane segments to provide a first polygon;

merging, with the at least one processor, the plurality of second lane segments to provide a second polygon;

determining, with the at least one processor, at least one first area of the first polygon that does not overlap the second polygon; and determining, with the at least one processor, at least one second area of the second polygon that does not overlap the first polygon, wherein the plurality of non-overlapping areas comprises the at least one first area and the at least one second area.

5. The method of claim 1, wherein selecting the first non-overlapping area comprises:

determining, with the at least one processor, an area of each non-overlapping area of the plurality of non-overlapping areas; and selecting, with the at least one processor, a non-overlapping area of the plurality of non-overlapping areas having a greatest area as the first non-overlapping area.

6. The method of claim 1, wherein selecting the first warp point comprises:

determining, with the at least one processor, a centroid of the first non-overlapping area; and selecting, with the at least one processor, the centroid as the first warp point.

7. The method of claim 1, further comprising:

determining, with the at least one processor, a further plurality of non-overlapping areas based on the at least one first lane segment after the warping and the at least one second lane segment;

selecting, with the at least one processor, a further non-overlapping area of the further plurality of non-overlapping areas;

selecting, with the at least one processor, a further warp point within the further non-overlapping area;

warping, with the at least one processor, the at least one first lane segment around the further warp point to increase the total overlapping area based on the at least one second lane segment and the at least one first lane segment after warping; and iteratively repeating the determining of the further plurality of non-overlapping areas, the selecting of the further non-overlapping area, the selecting of the further warp point, and the warping of the at least one first lane segment around the further warp point until the total overlapping area reaches a local maximum.

8. The method of claim 1, further comprising:

using, with the at least one processor, the first map data comprising the at least one first lane segment after the warping to facilitate at least one autonomous driving operation of an autonomous vehicle or to facilitate at least one simulated autonomous driving operation of a simulated autonomous vehicle.

9. A system for generating an updated map for use with an autonomous vehicle driving operation or a simulation thereof, comprising:

a map database configured to store first map data associated with a first map of a geographic location comprising a roadway, the first map data comprising at least one first lane segment representing the roadway;

a map data source system configured to obtain second map data associated with a second map of the geographic location, the second map data comprising at least one second lane segment representing the roadway; and a mapping system configured to:

obtain, from the map database, the first map data;

obtain, from the map data source system, the second map data;

determine a plurality of non-overlapping areas based on the at least one first lane segment and the at least one second lane segment;

select a first non-overlapping area of the plurality of non-overlapping areas;

select a first warp point within the first non-overlapping area; and warp the at least one first lane segment around the first warp point to increase a total overlapping area based on the at least one second lane segment and the at least one first lane segment after warping to generate updated map data associated with an updated map of the geographic location comprising the roadway, wherein warping the at least one first lane segment comprises:

adjusting the first warp point and points of the at least one first lane segment around the first warp point using inverse distance weighted interpolation;

determining the total overlapping area based on the at least one second lane segment and the at least one first lane segment after the adjusting; and iteratively repeating the adjusting and the determining of the total overlapping area until the total overlapping area reaches a local maximum.

10. The system of claim 9, wherein the map data source system comprises an autonomous vehicle comprising a ray-casting system configured to generate the second map data based on ray-casting operations of the ray-casting system.

11. The system of claim 9, wherein determining the plurality of non-overlapping areas comprises determining the symmetric difference of the at least one first lane segment and the at least one second lane segment.

12. The system of claim 9, wherein determining the plurality of non-overlapping areas comprises:
determining at least one first area of the at least one first lane segment that does not overlap the at least one second lane segment; and
determining at least one second area of the at least one second lane segment that does not overlap the at least one first lane segment,
wherein the plurality of non-overlapping areas comprises the at least one first area and the at least one second area.

13. The system of claim 9, wherein selecting the first non-overlapping area comprises:
determining an area of each non-overlapping area of the plurality of non-overlapping areas; and
selecting a non-overlapping area of the plurality of non-overlapping areas having a greatest area as the first non-overlapping area.

14. The system of claim 9, wherein selecting the first warp point comprises:
determining a centroid of the first non-overlapping area; and
selecting the centroid as the first warp point.

15. The system of claim 9, wherein the mapping system is further configured to:
determine a further plurality of non-overlapping areas based on the at least one first lane segment after the warping and the at least one second lane segment;
select a further non-overlapping area of the further plurality of non-overlapping areas;
select a further warp point within the further non-overlapping area;
warp the at least one first lane segment around the further warp point to increase the total overlapping area based on the at least one second lane segment and the at least one first lane segment after warping; and
iteratively repeat the determining of the further plurality of non-overlapping areas, the selecting of the further non-overlapping area, the selecting of the further warp point, and the warping of the at least one first lane segment around the further warp point until the total overlapping area reaches a local maximum.

16. The system of claim 9, further comprising an autonomous vehicle, wherein the mapping system is further configured to communicate the first map data comprising the at least one first lane segment after the warping to the autonomous vehicle, and wherein the autonomous vehicle is configured to use the first map data comprising the at least one first lane segment after the warping to facilitate at least one autonomous driving operation of the autonomous vehicle.

17. The system of claim 9, further comprising a simulation system, wherein the mapping system is further configured to communicate the first map data comprising the at least one first lane segment after the warping to the simulation system, and wherein the simulation system is configured to use the first map data comprising the at least one first lane segment after the warping to facilitate at least one simulated autonomous driving operation of a simulated autonomous vehicle.

18. A computer program product for generating an updated map for use with an autonomous vehicle driving operation or a simulation thereof, the computer program product comprising at least one non-transitory computer-readable medium comprising one or more instructions that, when executed by at least one processor, cause the at least one processor to:
obtain first map data associated with a first map of a geographic location comprising a roadway, the first map data comprising at least one first lane segment representing the roadway;
obtain second map data associated with a second map of the geographic location, the second map data comprising at least one second lane segment representing the roadway;
determine a plurality of non-overlapping areas based on the at least one first lane segment and the at least one second lane segment;
select a first non-overlapping area of the plurality of non-overlapping areas;
select a first warp point within the first non-overlapping area; and
warp the at least one first lane segment around the first warp point to increase a total overlapping area based on the at least one second lane segment and the at least one first lane segment after warping, wherein warping the at least one first lane segment comprises:
adjusting the first warp point and points of the at least one first lane segment around the first warp point using inverse distance weighted interpolation;
determining the total overlapping area based on the at least one second lane segment and the at least one first lane segment after the adjusting; and
iteratively repeating the adjusting and the determining of the total overlapping area until the total overlapping area reaches a local maximum.

* * * * *